US012334677B2

(12) United States Patent
Mizutani

(10) Patent No.: US 12,334,677 B2
(45) Date of Patent: Jun. 17, 2025

(54) CONNECTOR DEVICE

(71) Applicant: JAPAN AVIATION ELECTRONICS INDUSTRY, LIMITED, Tokyo (JP)

(72) Inventor: Ryota Mizutani, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 419 days.

(21) Appl. No.: 17/956,178

(22) Filed: Sep. 29, 2022

(65) Prior Publication Data

US 2023/0107655 A1 Apr. 6, 2023

(30) Foreign Application Priority Data

Oct. 6, 2021 (JP) ................................ 2021-164676

(51) Int. Cl.

*H01R 13/629* (2006.01)
*H01R 13/635* (2006.01)
(Continued)

(52) U.S. Cl.

CPC . *H01R 13/62955* (2013.01); *H01R 13/62938* (2013.01); *H01R 13/635* (2013.01); *H01R 13/639* (2013.01); *H01R 13/641* (2013.01)

(58) Field of Classification Search

CPC ........ H01R 13/62955; H01R 13/62938; H01R 13/635; H01R 13/639; H01R 13/641
See application file for complete search history.

(56) References Cited

U.S. PATENT DOCUMENTS 9,048,045 B2 * 6/2015 Henmi .................. H01H 21/02
9,325,112 B2 * 4/2016 Tabata ............ H01R 13/62966
(Continued)

FOREIGN PATENT DOCUMENTS

DE 102012216059 3/2013
EP 3454428 3/2019
(Continued)

OTHER PUBLICATIONS

Extended European Search Report Issued in Corresponding EP Patent Application No. 22197675.6, dated Feb. 15, 2023.
(Continued)

*Primary Examiner* — Thanh Tam T Le
(74) *Attorney, Agent, or Firm* — Greenblum & Bernstein, P.L.C.

(57) ABSTRACT

A connector with an interlock housing, to which an interlock terminal is attached, separately from a lever that performs connection and disconnection of main terminals with a mating connector, and a first spring piece is formed on the lever. After the main terminals are mutually connected by rotating the lever from a first position to a second position, the lever is slid from the second position to a third position and the interlock housing is pushed down from an opening position to a closing position. When the lever is on the third position and the interlock housing is on the opening position, the first spring piece generates a first elastic restoring force. When applying no external force that slides the lever to the third position against the first elastic restoring force, the lever moves away from the third position and the interlock housing cannot be pushed down.

6 Claims, 58 Drawing Sheets

(51) Int. Cl.
*H01R 13/639* (2006.01)
*H01R 13/641* (2006.01)

(56) References Cited

U.S. PATENT DOCUMENTS

| | | | | |
|---|---|---|---|---|
| 9,484,668 | B2 * | 11/2016 | Kamei | H01R 13/62938 |
| 10,163,590 | B2 * | 12/2018 | Tabata | H01R 13/701 |
| 11,217,939 | B2 * | 1/2022 | Yagi | H01H 9/085 |
| 11,245,226 | B2 * | 2/2022 | Yamane | H01R 24/005 |
| 11,476,065 | B2 * | 10/2022 | Kamei | H01H 21/54 |
| 11,677,184 | B2 * | 6/2023 | Yamane | H01R 13/62938 439/157 |
| 2003/0057958 | A1 | 3/2003 | Fukushima et al. | |
| 2013/0228429 | A1 | 9/2013 | Henmi | |
| 2019/0393649 | A1 | 12/2019 | Yamane et al. | |

FOREIGN PATENT DOCUMENTS

| | | |
|---|---|---|
| JP | 2003-100382 A | 4/2003 |
| WO | 2010/150975 | 12/2010 |

OTHER PUBLICATIONS

U.S. Appl. No. 17/828,101 to Ryota Mizutani, filed May 31, 2022.
U.S. Appl. No. 17/890,530 to Takeshi Takahashi et al., filed Aug. 18, 2022.

* cited by examiner

CONNECTOR DEVICE

TECHNICAL FIELD

The present invention relates to a connector device for high voltage and large current including a high-voltage interlock (HVIL).

BACKGROUND ART

FIG. 1 illustrates the configuration described in Japanese Patent Application Laid Open No. 2003-100382 as a conventional example of this kind of connector device, in which one connector housing 11 is mounted on the other connector housing 21 by operating a lever 12 attached to the one connector housing 11.

A terminal hood portion 11*a* is provided on the lower portion of the connector housing 11, and a pair of terminals (male terminals) 13 is provided in the terminal hood portion 11*a*. On the outer wall of the connector housing 11, a pair of guide pins 11*b* is provided in a protruding manner. The guide pins 11*b* are engaged with respective guide grooves 14 of the lever 12 which will be described later.

As illustrated in FIGS. 2A and 2B, the lever 12 includes a pair of arm plate portions 12*a* and 12*b* and an operation portion 12*c* that couples the arm plate portions 12*a* and 12*b* provided in a pair. The guide grooves 14 that horizontally extend are formed on the respective arm plate portions 12*a* and 12*b* provided in a pair. The guide pins 11*b*, which are provided in a pair, of the connector housing 11 are inserted into the respective guide grooves 14. Thus, the lever 12 is provided in a manner to be able to rotationally and linearly move with respect to the connector housing 11.

On the arm plate portions 12*a* and 12*b* provided in a pair, respective cam grooves 15 are formed in a pair. To the cam grooves 15, respective cam pins 21*a*, described later, of the other connector housing 21 are inserted when the one connector housing 11 is mounted on the other connector housing 21.

Further, the arm plate portion 12*b* is formed wider than the arm plate portion 12*a*. The arm plate portion 12*b* having the wider width is provided with a connector portion 12*d* and the connector portion 12*d* is provided with a fitting detection male terminal 16.

The other connector housing 21 has a substantially rectangular parallelepiped shape whose top surface is opened and whose inner space serves as a mounting space 21*b* of the connector housing 11. A terminal hood accommodating portion 21*c* is provided on a bottom surface portion, which is the bottom surface of the mounting space 21*b*, and a pair of terminals (female terminals) 22 is accommodated in the terminal hood accommodating portion 21*c*.

The respective cam pins 21*a* are provided in a pair in a protruding manner on symmetrical positions on an inner circumferential wall of the connector housing 21, and a connector portion 21*d* is further provided in the mounting space 21*b*. The connector portion 21*d* is provided with a pair of fitting detection female terminals 23 (see FIGS. 4A and 4B described later).

FIGS. 3A to 3C illustrate states of the lever 12 together with the cam pin 21*a* of the other connector housing 21 in a process of mounting the one connector housing 11 on the other connector housing 21 by inserting the one connector housing 11 into the mounting space 21*b* of the other connector housing 21 from a state before the one connector housing 11 is mounted on the other connector housing 21, illustrated in FIG. 1. FIG. 3A illustrates a state in which the lever 12 is rotated from a rotation starting position illustrated in FIG. 1 in an arrow a direction to be positioned between the rotation starting position and a rotation completion position. FIG. 3B illustrates a state in which the lever 12 is on the rotation completion position. Further, FIG. 3C illustrates a state in which the lever 12 is slid in an arrow b direction and is on a fitting completion position.

The cam pins 21*a* of the other connector housing 21 that are inserted into the cam grooves 15 of the lever 12 move along the cam grooves 15 along with the rotation of the lever 12. Accordingly, the one connector housing 11 gradually approaches and moves into the other connector housing 21 and this approach brings the terminals 13 and 22 of both connector housings 11 and 21 into contact with each other by the time when the lever 12 comes to be positioned on the rotation completion position.

Then, when the lever 12 is slidingly moved in the arrow b direction from the rotation completion position to the fitting completion position, the fitting detection male terminal 16 of the lever 12 comes into contact with the pair of fitting detection female terminals 23 of the other connector housing 21 by the time when the lever 12 comes to be positioned on the fitting completion position. FIGS. 4A and 4B illustrate a state in which the lever 12 is positioned on the fitting completion position and the mounting of the one connector housing 11 onto the other connector housing 21 is completed.

The operation of the lever 12 is thus composed of two actions which are the rotation operation and the sliding operation. By the sliding operation after the rotation operation, the fitting detection male terminal 16 comes into contact with the fitting detection female terminals 23 and the fitting is detected. This detection of the fitting allows a power source circuit to be in a conductive state and supply current between the terminals 13 and 22.

The operation of the lever 12 for shifting the power source circuit from the conductive state to a non-conductive state is composed of reverse two actions, where the power source circuit is turned off by the sliding operation performed first and the terminals 13 and the terminals 22 separate from each other through the rotation operation subsequently performed.

Accordingly, the power source circuit can be prevented from becoming into a conductive state before the operation of the lever 12 is completed and an occurrence of arc discharge can be prevented.

As described above, the connector device of the related art, illustrated in FIG. 1, performs connection and disconnection of terminals for large current through the rotation operation of the lever, and performs connection and disconnection of terminals for fitting detection, constituting HVILs, through the sliding operation of the lever. Accordingly, time difference is secured between connection or disconnection of terminals for large current and connection or disconnection of HVILs and thus, fitting and separation of the connector device is safely performed.

Thus, connection and disconnection of terminals for large current and connection and disconnection of HVILs are performed through a series of operations of a lever including rotation and sliding of the lever. In this method, if the series of operations is performed quickly, a problem may arise in which a sufficient time interval for securing safety is not secured between the connection or disconnection of terminals for large current and the connection or disconnection of HVILs.

SUMMARY OF THE INVENTION

An object of the present invention is to provide a connector device that provides a more sufficient time interval between connection or disconnection of terminals for large current and connection or disconnection of HVILs compared to the related art so as to be able to further prevent HVIL connection unintended by an operator, and whose fitting and separation work can be more safely performed than the related art.

The technical matters contained in this section are provided neither to expressly or implicitly limit the invention(s) listed in the claim(s) nor to allow persons other than those who benefit from the present invention (for example, the applicant and the right holder) to limit the invention(s) listed in the claim(s), but solely to facilitate an understanding of the gist of the present invention(s). An overview of the present invention from another point of view can be understood, for example, from the scope of claims at the time of filing this patent application.

The connector device includes a first connector and a second connector that can be mutually fitted, and a lever that is attached to a first housing and a second housing.

The first connector includes a first high voltage terminal, a first low voltage terminal, the first housing that houses the first high voltage terminal, and a first interlock housing that houses the first low voltage terminal.

The second connector includes a second high voltage terminal, a second low voltage terminal, the second housing that houses the second high voltage terminal, and a second interlock housing that houses the second low voltage terminal.

The lever, the first housing, and the second housing have a configuration enabling a rotation operation and sliding operation of the lever, and preferably satisfy all of the following conditions (a), (b), (c), and (d), for example.

(a) One of the lever and the first housing has a first boss and the other of the lever and the first housing has a first groove. The first groove is a linear groove. The first boss can move along the first groove between a first position and a second position in the first groove. Commonly, the first position is, but is not limited to, one end of the first groove, and the second position is, but is not limited to, the other end of the first groove.

(b) One of the lever and the second housing has a second boss and the other of the lever and the second housing has a second groove. The second groove is composed of a linear groove portion and an arc groove portion, and one end of the linear groove portion and one end of the arc groove portion are connected with each other. The second boss can move along the second groove between a third position and a fourth position in the second groove and between the fourth position and a fifth position in the second groove. The fourth position is a boundary between the linear groove portion and the arc groove portion, the third position is, but is not limited to, the other end of the arc groove portion, and the fifth position is, but is not limited to, the other end of the linear groove portion. In a state in which the lever is attached to the first housing and the second housing, a distance between the first position and the third position is longer than a distance between the first position and the fourth position.

(c) The rotation operation of the lever can be performed with the first position as a fulcrum, when the first boss is at the first position. In response to the rotation operation of the lever, the second boss moves between the third position and the fourth position along the arc groove portion of the second groove.

(d) The sliding operation of the lever can be performed when the second boss is in the linear groove portion of the second groove. In response to the sliding operation of the lever, the first boss moves between the first position and the second position along the first groove and the second boss moves between the fourth position and the fifth position along the linear groove portion of the second groove. The first boss is at the first position when the second boss is at the fourth position, and the first boss is at the second position when the second boss is at the fifth position.

When the second boss is at the third position, the first high voltage terminal and the second high voltage terminal are not connected with each other.

As the second boss moves from the third position to the fourth position in response to the rotation operation of the lever, the first housing and the second housing draw each other. As a result, the first housing and the second housing are fitted to each other and the first high voltage terminal and the second high voltage terminal are connected with each other.

The first connector has a locking mechanism for locking the first interlock housing and a sliding mechanism for sliding the first interlock housing. Only when the second boss is at the fifth position as a result of the sliding operation of the lever (as described above, the first boss is at the second position at this time), the first interlock housing is unlocked and the sliding operation of the first interlock housing can be performed. Unlocking of the first interlock housing is achieved, for example, through the sliding operation of the lever in which a portion of the lever releases the locking mechanism. In response to the sliding operation of the first interlock housing, the first interlock housing and the second interlock housing are fitted to each other and the first low voltage terminal and the second low voltage terminal are connected with each other.

A lever includes a first spring piece. When the second boss is in a range from the third position to the fourth position, no load is applied to the first spring piece of the lever. In a process in which the second boss moves from the fourth position to the fifth position in response to the sliding operation of the lever, the first spring piece of the lever is pushed by a portion (which is called a "pressing portion" for convenience) of the first interlock housing. Accordingly, when an operator of the lever releases his/her hand from the lever in a state in which the second boss is at the fifth position, the lever is pushed back by a restoring force of the first spring piece. That is, the second boss cannot stay in the fifth position and the first interlock housing is locked by the locking mechanism. In other words, the sliding operation of the first interlock housing can be performed only when an operator of the lever consciously holds the lever. When the sliding operation of the first interlock housing is performed in the state in which the second boss is at the fifth position, the lever is not pushed back because of the fitting between the first interlock housing and the second interlock housing. That is, the second boss stays in the fifth position. This configuration prevents unintended connection between the first low voltage terminal and the second low voltage terminal.

Preferably, the configuration may be employed in which the pressing portion of the first interlock housing moves along with the sliding operation of the first interlock housing and consequently, the first spring piece of the lever is not pushed by the pressing portion of the first interlock housing in the state in which the first low voltage terminal and the second low voltage terminal are connected with each other. This configuration can prevent loss of elasticity of the first spring piece caused by long-term connection.

Alternatively, the lever includes a second spring piece. When the second boss is at the third position, no load is applied to the second spring piece of the lever. In a process in which the second boss moves from the third position to the fourth position in response to the rotation operation of the lever, the second spring piece of the lever is pushed by a portion (which is called a "pressing portion" for convenience) of the second housing. Accordingly, when an operator of the lever releases his/her hand from the lever in a state in which the second boss is at the fourth position, the lever is pushed back by a restoring force of the second spring piece. That is, the second boss cannot stay on the fourth position. In other words, the sliding operation of the lever can be performed only when an operator of the lever consciously holds the lever. The first boss is at the second position when the second boss is at the fifth position as a result of the sliding operation of the lever and therefore, the rotation operation of the lever is prevented. This configuration prevents unintended connection between the first high voltage terminal and the second high voltage terminal.

Preferably, the configuration may be employed in which the second spring piece of the lever moves along with the sliding operation of the lever and consequently, the second spring piece of the lever is not pushed by the pressing portion of the second housing in the state in which the first high voltage terminal and the second high voltage terminal are connected with each other. This configuration can prevent loss of elasticity of the second spring piece caused by long-term connection.

The lever may include both of the above-described first spring piece and the above-described second spring piece.

The "housing" is not limited to an object that is narrowly interpreted according to its dictionary definition. That is, "housing" is not limited to an object that has only a function based on the dictionary definition of the term (however, this object may be a single element or may be composed of two or more elements), or is not limited to a portion of a single object, the portion having a function based on the dictionary definition of the term. A "housing" may be an object that has only a function based on the dictionary definition of the term, or it may be an object that has a function which is not a function based on the dictionary definition of the term, or it may be an object that has one or more other functions in addition to the function based on the dictionary definition of the term, or it may be a single object that includes a portion having the function based on the dictionary definition of the term and a portion not having the function based on the dictionary definition of the term.

EFFECTS OF THE INVENTION

According to the connector device of the present invention, connection of the HVILs is performed in a manner such that after the main terminals for large current are mutually connected through the rotation operation of the lever, the sliding operation of the lever is performed and the interlock housing is pushed down. On the other hand, disconnection of the main terminals is performed in a manner such that after the HVILs are mutually disconnected by pulling up the interlock housing, the sliding operation of the lever is performed and the rotation operation of the lever is further performed.

Thus, an additional step for operating the interlock housing is required compared to the conventional example in which connection and disconnection of terminals for large current and connection and disconnection of HVILs are performed through the rotation operation and sliding operation of a lever. This additional step produces a larger time difference between the connection or disconnection of main terminals for large current and the connection or disconnection of HVILs, being able to enhance safety in a fitting and separation work of the connector device compared to the related art.

In addition to this, according to the connector device of the present invention, when an operator interrupts an operation and releases his/her hand from the lever in a state in which the sliding operation of the lever is performed, the lever does not stay in the position but is pushed back. Therefore, even when an external force unintended by an operator is applied to an interlock housing, the interlock housing does not slide to a closing position, being able to prevent HVILs from being easily connected against the operator's intention. Thus, safety can be further enhanced also from this point.

DETAILED DESCRIPTION OF THE EMBODIMENTS

An embodiment of the present invention will be described with reference to the accompanying drawings.

Figure 1:
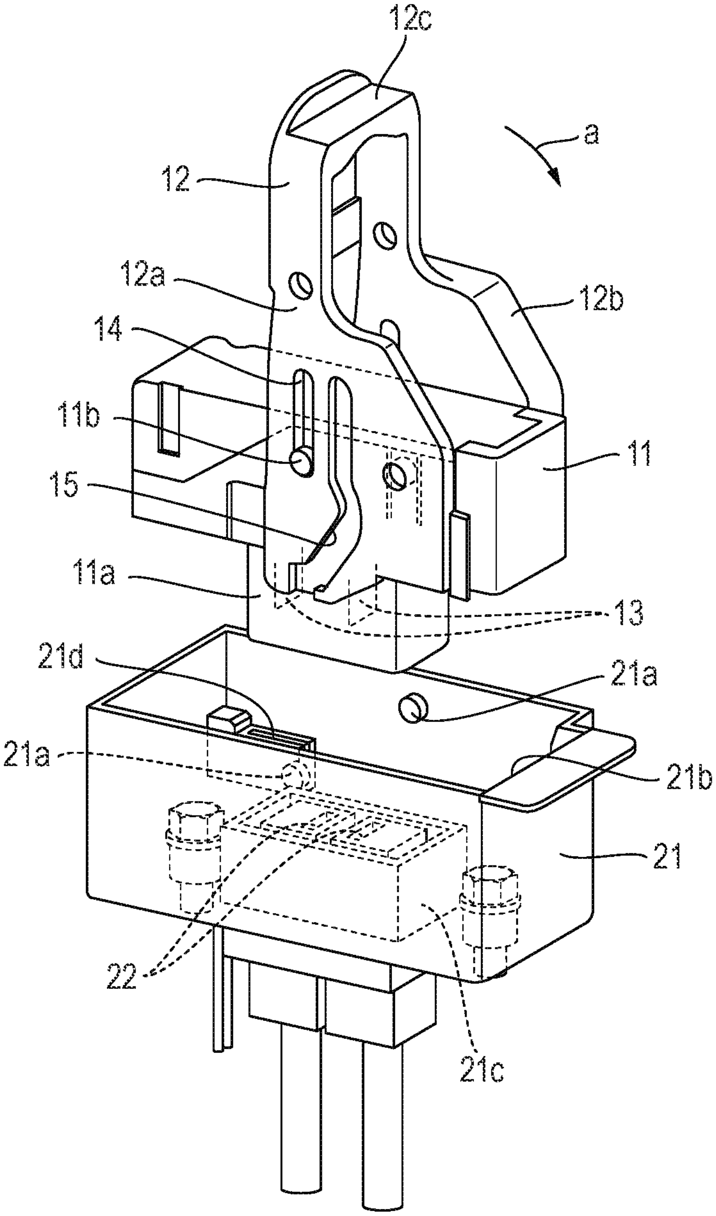
FIG. 1 (PRIOR ART)
FIG. 1 is a perspective view illustrating a conventional example of a connector device.
Figure 2A:
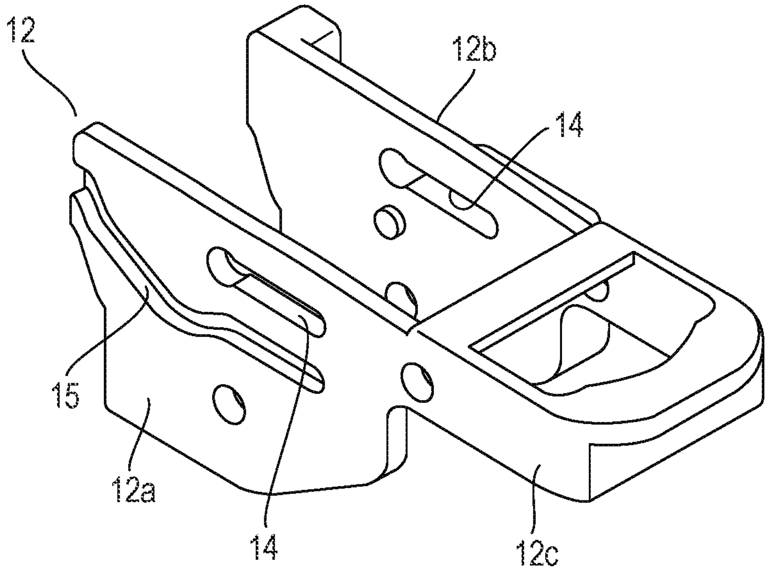
FIG. 2A (PRIOR ART)
FIG. 2A is a perspective view of a lever of FIG. 1.
Figure 2B:
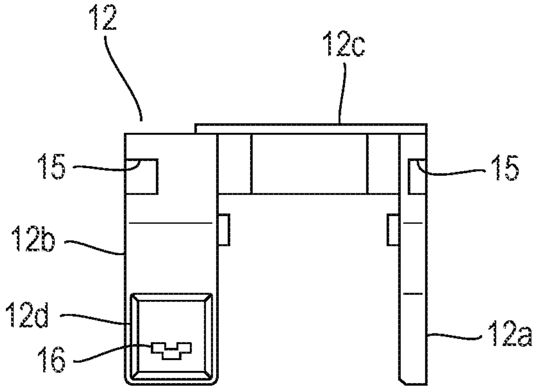
FIG. 2B (PRIOR ART)
FIG. 2B is a lateral view of the lever of FIG. 1.
Figure 3A:
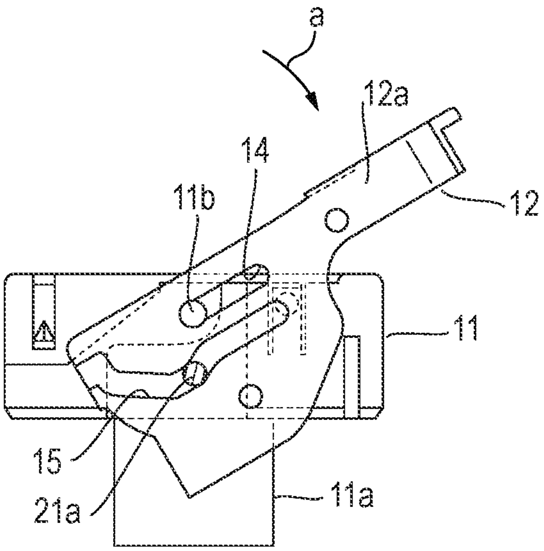
FIG. 3A (PRIOR ART)
FIG. 3A is an elevational view illustrating a state in which the lever is positioned between a rotation starting position and a rotation completion position.
Figure 3B:
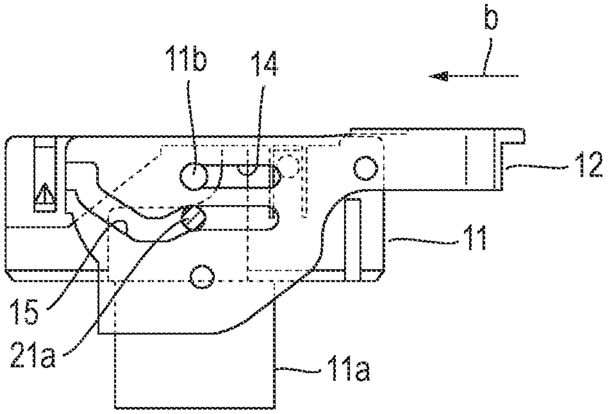
FIG. 3B (PRIOR ART)
FIG. 3B is an elevational view illustrating a state in which the lever is positioned on the rotation completion position.
Figure 3C:
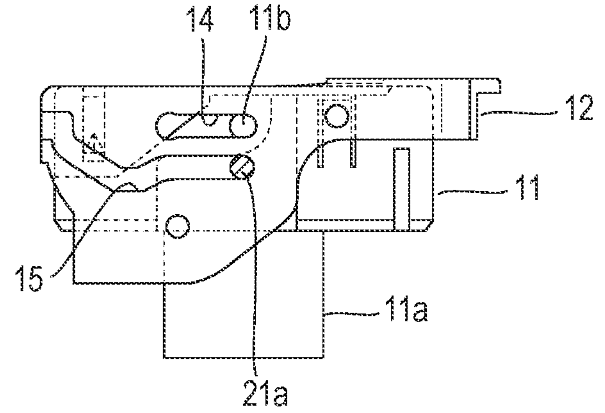
FIG. 3C (PRIOR ART)
FIG. 3C is an elevational view illustrating a state in which the lever is positioned on a fitting completion position.
Figure 4A:
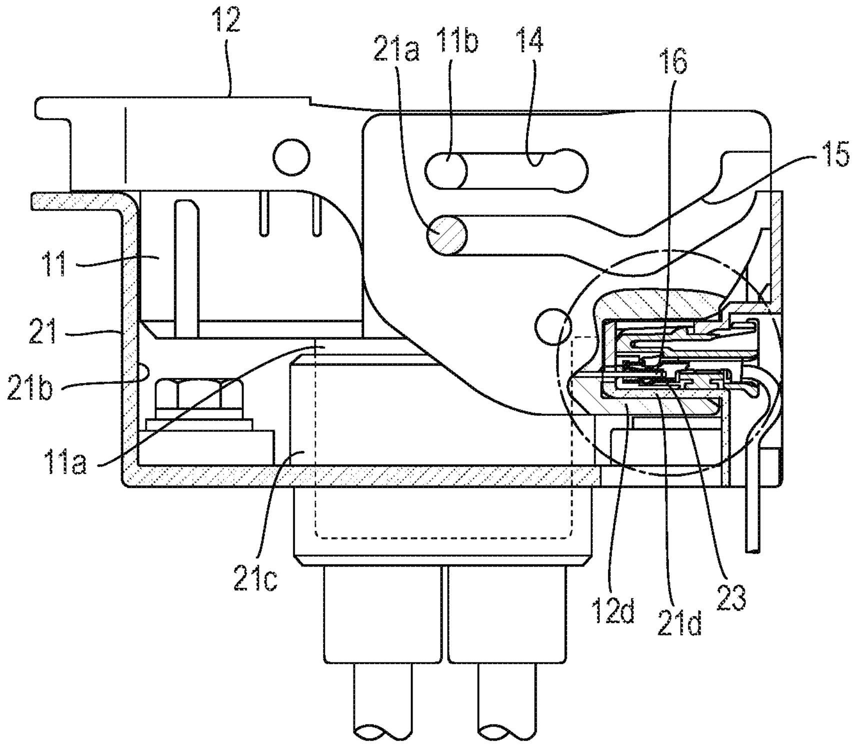
FIG. 4A (PRIOR ART)
FIG. 4A is a partial sectional view illustrating a mounting completion state of the connector device illustrated in FIG. 1.
Figure 4B:
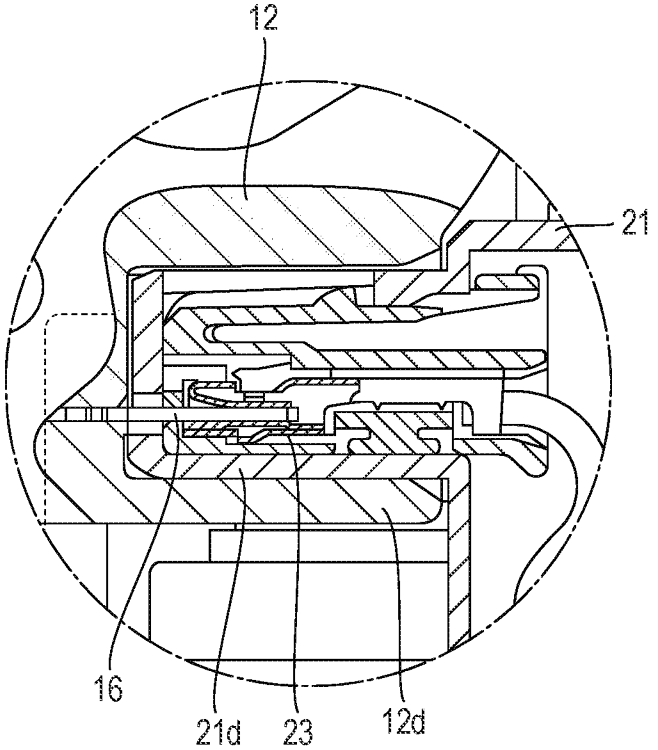
FIG. 4B (PRIOR ART)
FIG. 4B is an enlarged view illustrating principal portions of FIG. 4A.
Figure 5A:
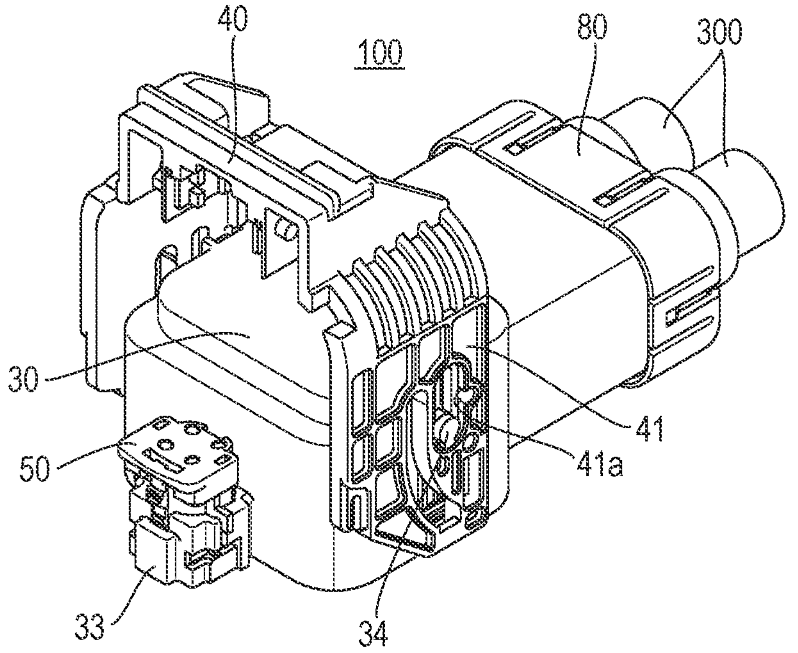
FIG. 5A is an upper perspective view illustrating a connector of a connector device according to an embodiment of the present invention.
Figure 5B:
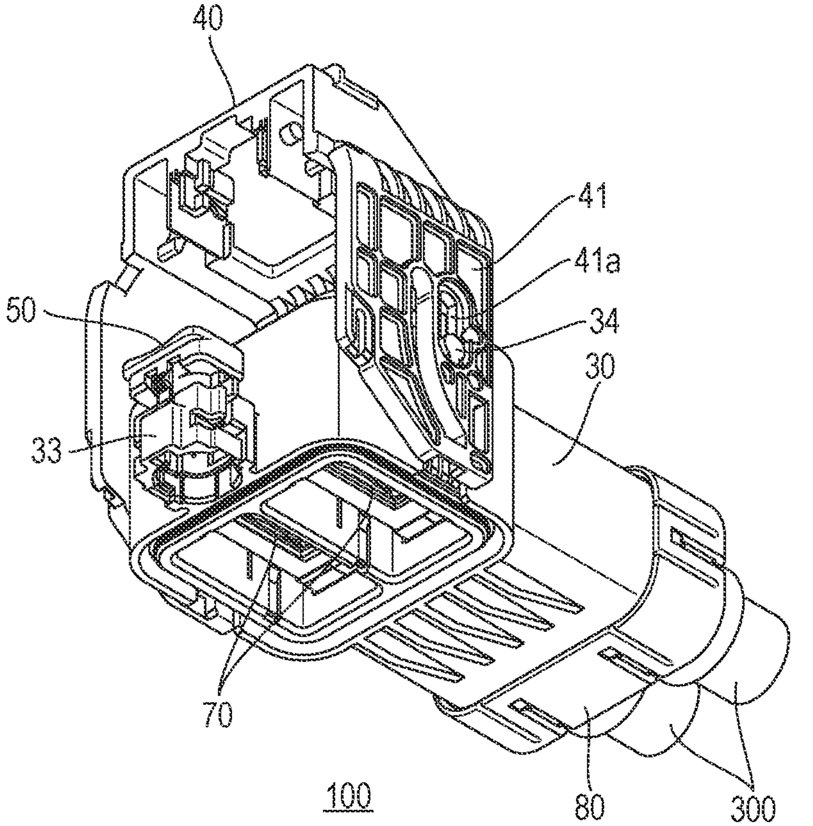
FIG. 5B is a lower perspective view of the connector illustrated in FIG. 5A.

FIGS. 5A and 5B and FIGS. 6A to 6C respectively illustrate a connector 100 and a mating connector 200 that constitute a connector device for high voltage and large current, including HVILs, according to an embodiment of the present invention. In FIGS. 5A and 5B, 30 denotes a housing and 40 denotes a lever. Further, 50 denotes an interlock housing and interlock terminals 60 are attached to the interlock housing 50 as described later. In FIGS. 5A and 5B, 300 denotes a cable. The connector 100 is attached to terminals of two cables 300 in this example. In FIGS. 5A and 5B, 70 denotes main terminals that are respectively connected with the two cables 300, and 80 denotes a cable cover that is attached to the housing 30.

The configurations of the housing 30, the lever 40, and the interlock housing 50 of the connector 100 will be first described.

As illustrated in FIGS. 7A to 7D, the housing 30 is roughly composed of a fitting portion 31, a cable accommodating portion 32 that adjoins the rear portion of the fitting portion 31, and an attaching portion 33 that is positioned on the front surface of the fitting portion 31. The fitting portion 31 has a box-like shape whose bottom is opened. The main terminals 70 are accommodated and positioned in this fitting portion 31. On both lateral surfaces of the fitting portion 31, guide shafts 34 are formed in a pair in a manner to protrude mutually outward.

The attaching portion 33 is a portion to which the interlock housing 50 is attached and has a substantially cylindrical shape opening in a vertical direction. On an intermediate portion in the vertical direction of the attaching portion 33, slits 35 are formed in a pair on mutually opposed positions. The slit 35 extends rearward from the front end of the attaching portion 33. Further, slits 36 are formed in a pair on mutually opposed positions from the upper end of the attaching portion 33 to respective slits 35. The rear end sides of the slits 35 and the slits 36 communicate the inside and the outside of the attaching portion 33.

The lever 40 includes a pair of arm portions 41, a coupling portion 42, and an operation portion 43, as illustrated in FIGS. 8A and 8B and FIGS. 9A to 9F. The arm portion 41 has a plate shape. The coupling portion 42 couples proximal ends of the pair of arm portions 41. The operation portion 43 is positioned on an opposite side to the coupling portion 42 with the arm portions 41 interposed therebetween. The operation portion 43 is positioned below the lower end of the coupling portion 42 (in FIG. 8A), and reinforcing walls 44, which are provided in a pair and extend in the vertical direction (in FIG. 8A), are positioned on both ends in the longitudinal direction of the operation portion 43 in a manner to be continuously formed between the coupling portion 42 and the operation portion 43.

On the respective arm portions 41 of the pair, guide grooves 41*a* are formed and cam grooves 41*b* are further formed. The guide grooves 41*a* extend in the longitudinal direction of the arm portions 41. The cam groove 41*b* has a curved shape and the distal end of the cam groove 41*b* is positioned on the distal end of the arm portion 41, as illustrated in FIGS. 8A and 8B and FIGS. 9A to 9F. Further, held portions 41*c* having a concave shape are formed on outer surfaces on the lower end parts (in FIG. 8B) of the distal ends of respective arm portions 41.

An opening 42*a* is formed in the lower half portion (in FIG. 9B) of the coupling portion 42 and an opening 43*a* is also formed on the operation portion 43. The opening 43*a* communicates with the opening 42*a*. On both sides of the opening 43*a* in the longitudinal direction of the operation portion 43, wall portions 45 extending in the vertical direction (in FIG. 8B) are respectively formed. In the mutually-inner sides of a pair of wall portions 45, protruding portions 46 are formed in a pair along respective wall portions 45.

The protruding portion 46 has an L-shaped cross section and extends in the longitudinal direction of the arm portion 41. One half portions of respective L shapes that are orthogonal to the respective wall portions 45 and mutually protrude inward serve as slide insertion portions 46*a*. An end portion, positioned closer to the arm portion 41, of the slide insertion portion 46*a* functions as a pressing portion 46*b* and a cut-out portion adjacent to the pressing portion 46*b* functions as an interference portion 46*c*. On mutual outer surfaces of the pair of wall portions 45, held portions 47 having a shaft shape are respectively formed in a protruding manner.

Figure 9A:
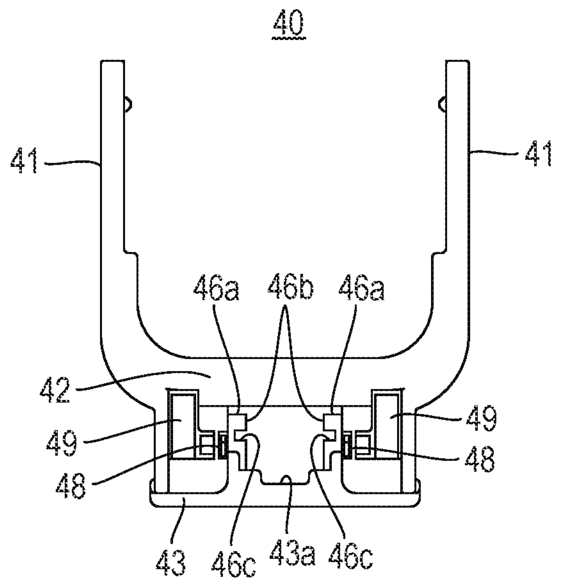
FIG. 9A is a plan view of the lever illustrated in FIG. 8A.
Figure 9B:
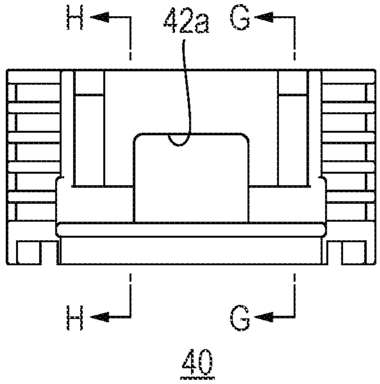
FIG. 9B is an elevational view of the lever illustrated in FIG. 8A.
Figure 9C:
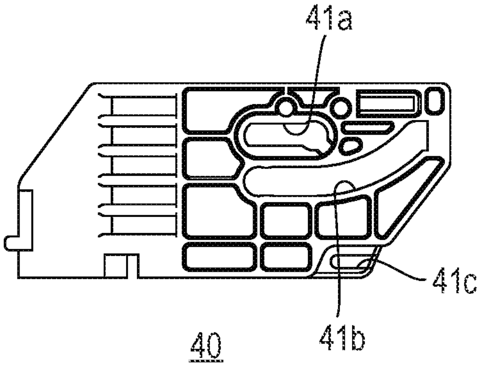
FIG. 9C is a right side view of the lever illustrated in FIG. 8A.
Figure 9D:
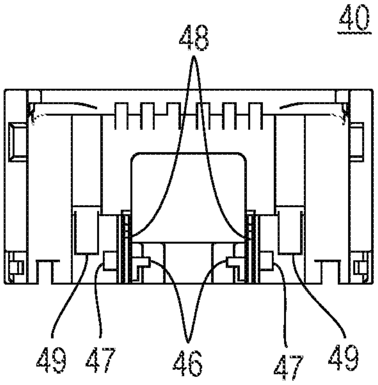
FIG. 9D is a rear view of the lever illustrated in FIG. 8A.
Figure 9E:
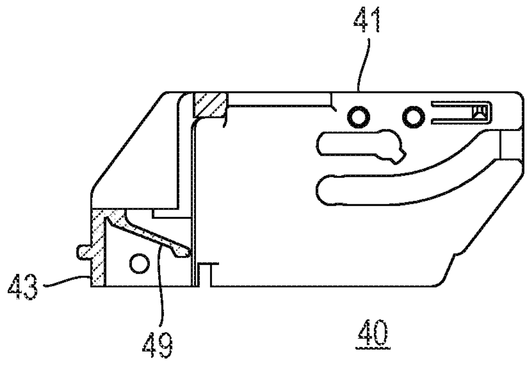
FIG. 9E is a sectional view taken along the G-G line of FIG. 9B.
Figure 9F:
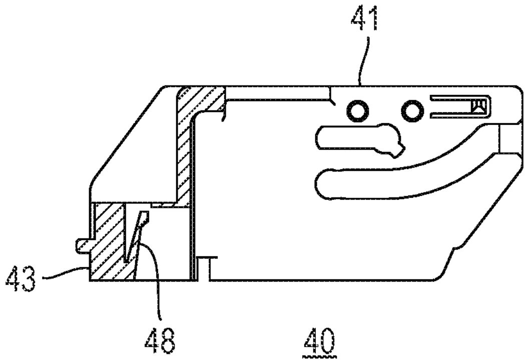
FIG. 9F is a sectional view taken along the H-H line of FIG. 9B.
Figure 10A:
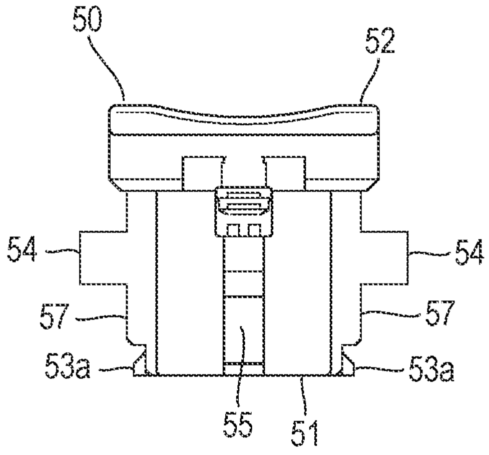
FIG. 10A is an elevational view of an interlock housing to which an interlock terminal of FIG. 5A is attached.
Figure 10B:
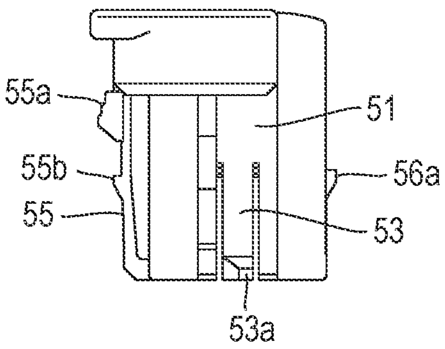
FIG. 10B is a right side view of the interlock housing to which the interlock terminal of FIG. 5A is attached.
Figure 10C:
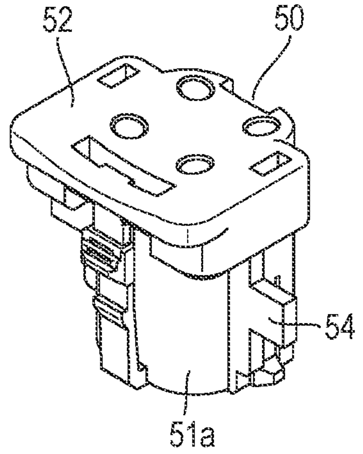
FIG. 10C is a perspective view of the interlock housing to which the interlock terminal of FIG. 5A is attached and which is viewed from an upper front side.
Figure 10D:
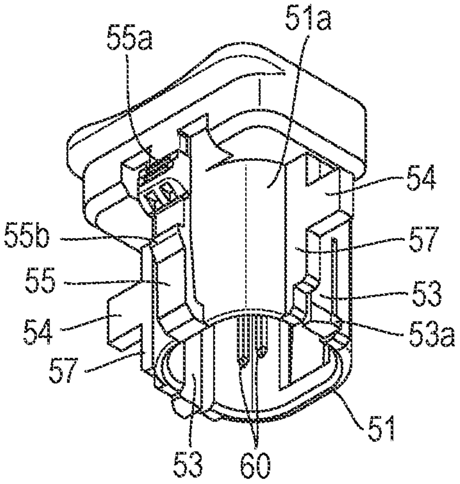
FIG. 10D is a perspective view of the interlock housing to which the interlock terminal of FIG. 5A is attached and which is viewed from a lower front side.
Figure 10E:
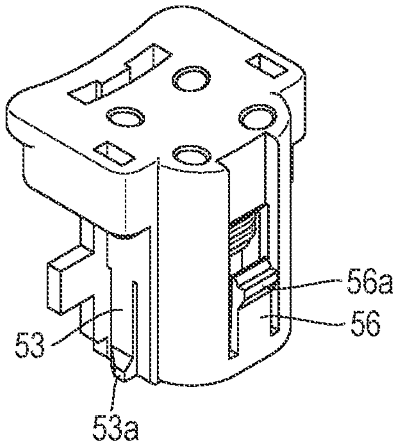
FIG. 10E is a perspective view of the interlock housing to which the interlock terminal of FIG. 5A is attached and which is viewed from an upper rear side.

In this example, a pair of first spring pieces 48 and a pair of second spring pieces 49 are further formed on the operation portion 43. Each of the first spring pieces 48 is provided between a corresponding wall portion 45 of the pair of wall portions 45 and a corresponding protruding portion 46 of the pair of protruding portions 46. Each of the second spring pieces 49 is provided on an outer side of the held portion 47 that is formed on the outer surface of each of the pair of wall portions 45. The first spring piece 48 has a shape whose proximal end (fixed end) is on the lower end side (in FIG. 9F) of the operation portion 43 and that extends diagonally upward toward the direction of the arm portion 41 as illustrated in FIG. 9F. The second spring piece 49 has a shape whose proximal end is on the upper end side (in FIG. 9E) of the operation portion 43 and that extends diagonally downward toward the direction of the arm portion 41 as illustrated in FIG. 9E.

The interlock housing 50 includes a cylindrical portion 51 and an operation portion 52 as illustrated in FIGS. 10A to 10E. The operation portion 52 is positioned on an upper end of the cylindrical portion 51 and has a shape that lids the cylindrical portion 51. The interlock terminals 60 which serve as short terminals are attached and fixed in the inside of the cylindrical portion 51.

On the cylindrical portion 51, a pair of spring pieces 53, a pair of protruding pieces 54, a locking piece 55, and a retaining piece 56 are integrally formed. The pair of spring pieces 53 is formed by making slits in the vertical direction on a circumferential wall 51*a* of the cylindrical portion 51 and these spring pieces 53 are provided on mutually opposed positions on the circumferential wall 51*a*. Upper ends of the pair of spring pieces 53 are proximal ends and on respective lower ends (distal ends) of the spring pieces 53, protrusion portions 53*a* are formed in a manner to protrude mutually outward.

When the protruding directions of the protrusion portions 53*a* of the pair of spring pieces 53 are defined as a left-right direction, the locking piece 55 is formed in a manner such that the locking piece 55 extends upward from the lower end of the circumferential wall 51*a* at the front side of the circumferential wall 51*a*. On the distal end (upper end) of the locking piece 55, an operation protrusion portion 55*a* is formed in a manner to protrude frontward. In the middle of the extending direction of the locking piece 55, a protrusion 55*b* is formed in a manner to protrude frontward. The retaining piece 56 is formed on a position, opposed to the position of the locking piece 55, on the circumferential wall 51*a* in a manner such that the retaining piece 56 extends upward from the lower end of the circumferential wall 51*a*. On the distal end of the retaining piece 56, a protrusion 56*a* is formed in a manner to protrude rearward.

The protruding pieces 54, provided in a pair, are formed adjacent to respective spring pieces 53 on the frontward side, that is, on the side on which the locking piece 55 is positioned. The protruding pieces 54 are formed in a manner to be further protruded and extended outward from respective plate portions 57 that are formed in a manner to protrude mutually outward from the circumferential wall 51*a* and extend in the vertical direction.

The interlock housing 50 that has the above-described configuration and holds the interlock terminals 60 is inserted into from the upper side and attached to the attaching portion 33 of the housing 30, and the interlock housing 50 is retained by the engagement of the protrusion 56*a* of the retaining piece 56. Further, the lever 40 is attached to the housing 30 in a manner such that the guide shafts 34, provided in a pair, of the housing 30 are inserted in and positioned on the respective guide grooves 41*a* of the pair of arm portions 41. The lever 40 can rotate between a first position and a second position and can slide between the second position and a third position with respect to the housing 30, where the first position, the second position, and the third position are positions for the lever 40 to take as described later. FIGS. 5A and 5B illustrate a state in which the lever 40 is in the first position.

Figure 6A:
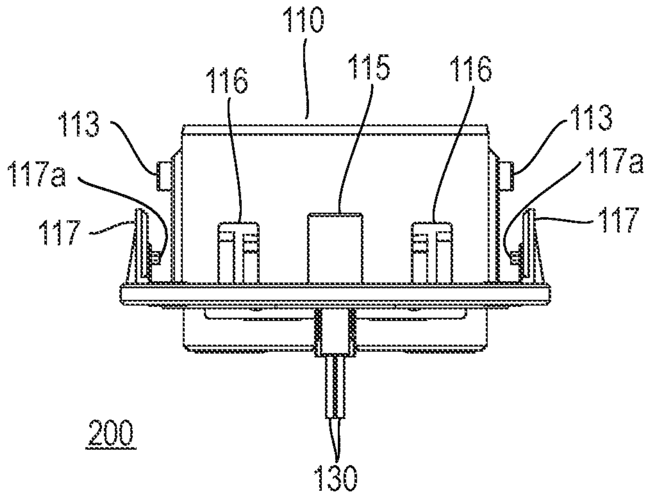
FIG. 6A is an elevational view illustrating a mating connector of the connector device according to the embodiment of the present invention.
Figure 6B:
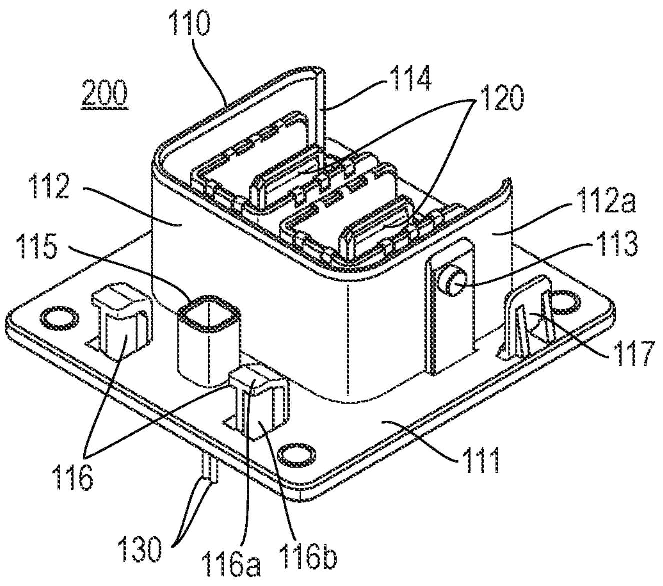
FIG. 6B is a front side perspective view of the mating connector illustrated in FIG. 6A.
Figure 6C:
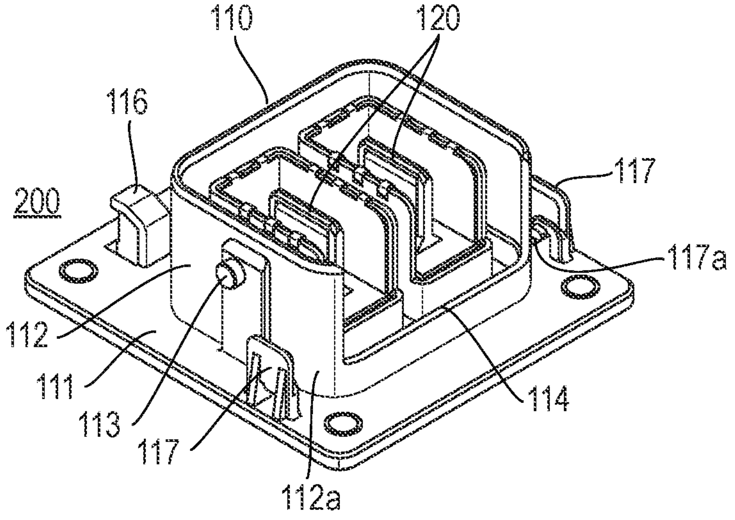
FIG. 6C is a rear side perspective view of the mating connector illustrated in FIG. 6A.
Figure 7A:
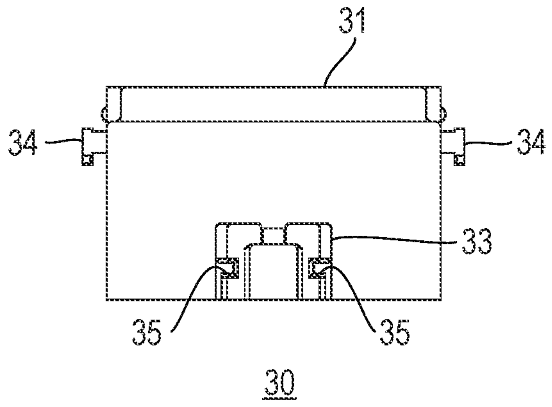
FIG. 7A is an elevational view of a housing of FIG. 5A.
Figure 7B:
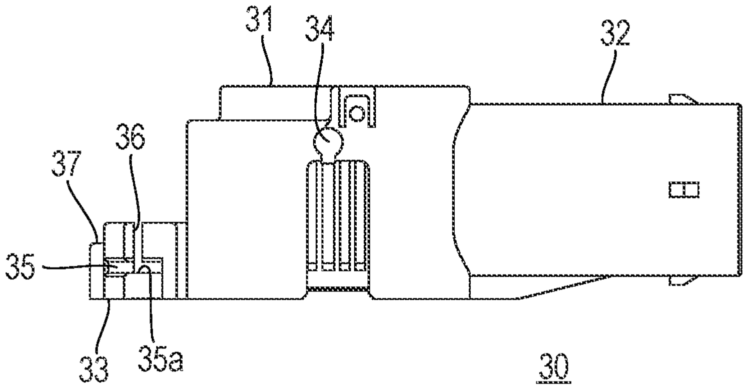
FIG. 7B is a right side view of the housing of FIG. 5A.
Figure 7C:
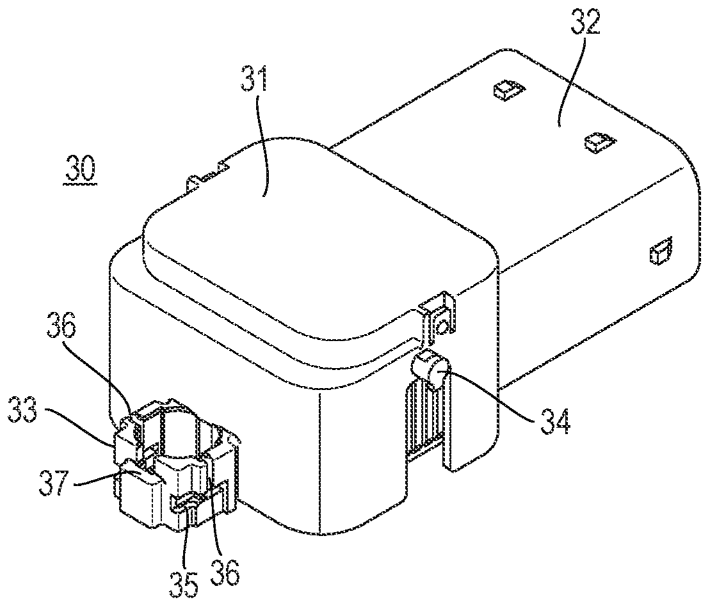
FIG. 7C is a perspective view of the housing of FIG. 5A viewed from above the housing.
Figure 7D:
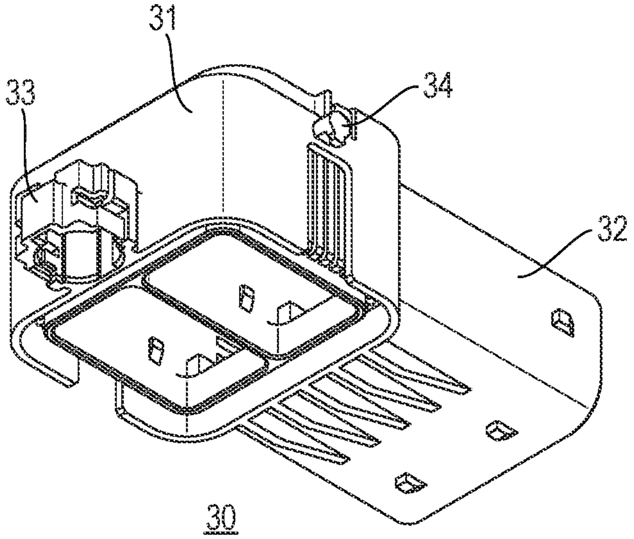
FIG. 7D is a perspective view of the housing of FIG. 5A viewed from below the housing.
Figure 8A:
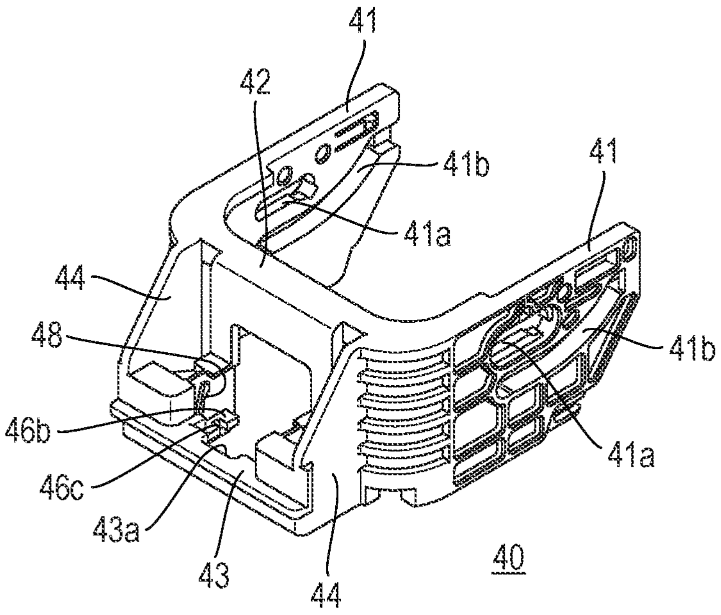
FIG. 8A is a perspective view of a lever of FIG. 5A viewed from above.
Figure 8B:
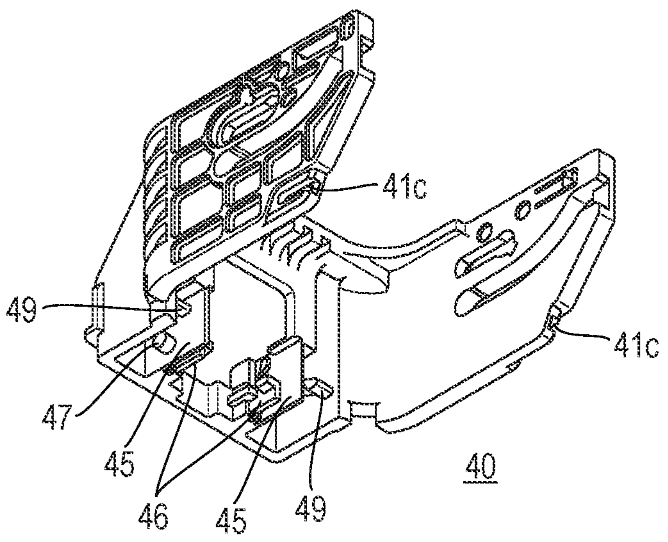
FIG. 8B is a perspective view of the lever of FIG. 5A viewed from below.

On the other hand, in FIGS. 6A to 6C illustrating the mating connector 200, 110 denotes a mating housing and 120 denotes a mating main terminal Further, 130 denotes a mating interlock terminal. The mating connector 200 is to be mounted on a substrate.

The mating housing 110 includes a plate portion 111 and a fitted portion 112. The fitted portion 112 has a frame shape opening upward and is positioned on the plate portion 111 in a protruding manner. Of a frame shaped circumferential wall 112*a* of the fitted portion 112, portions at the left and right positions have each driven bosses 113 in a pair formed on their outer surfaces in a manner to protrude mutually outward. Further, a rearward portion of the circumferential wall 112*a* is largely cut with a cutout 114. A pair of mating main terminals 120 is contained and positioned in the inside of the fitted portion 112.

On the plate portion 111 of the mating housing 110, an attaching portion 115, a pair of protruding portions 116, and a pair of holding portions 117 are further formed. The attaching portion 115 is positioned on the front side of the fitted portion 112 and has a cylindrical shape opening upward. The mating interlock terminals 130 are attached and fixed in the attaching portion 115.

The protruding portions 116 are provided in a pair at the left and the right sides of the attaching portion 115 in front of the fitted portion 112. Each of the protruding portions 116 has a shape in which an eaves-like portion 116*a* directing frontward is supported by an upright portion 116*b* which vertically rises from the plate portion 111. The holding portions 117 are provided in a pair at the left and the right sides of the rear portion of the fitted portion 112. The holding portion 117 has a plate surface orthogonal to the plate portion 111. On the plate surfaces of the pair of holding portions 117, protrusions 117*a* are formed in a manner to protrude mutually inward.

A fitting operation between the connector 100 and the mating connector 200 which are described above will now be described.

FIGS. 11 to 14 illustrate respective states 1 to 4 in the fitting process between the connector 100 and the mating connector 200 in order, and FIGS. 15A and 15B, FIGS. 16A to 16C, FIGS. 17A to 17C, and FIGS. 18A to 18D illustrate details of principal portions in the respective states 1 to 4. Here, the states 1 to 4 are states in a series of a fitting process performed based on an intention of an operator.

Figure 11:
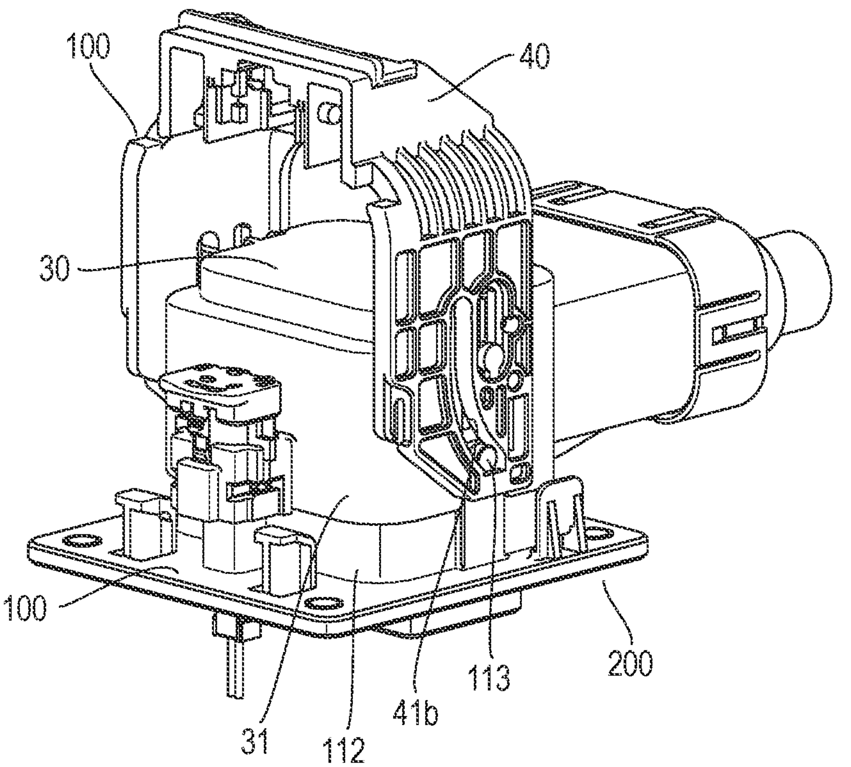
FIG. 11 is a perspective view illustrating a state in which the connector of the connector device according to the embodiment of the present invention is on a fitting preparation position.
Figure 12:
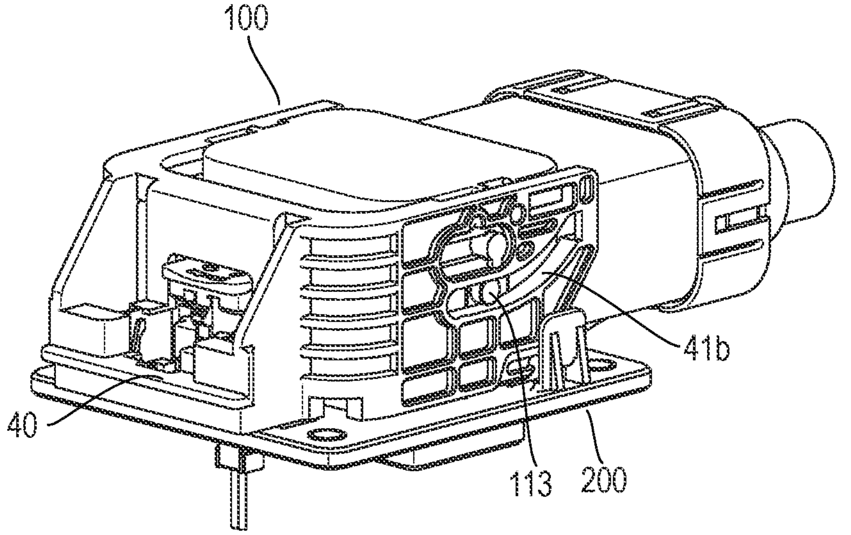
FIG. 12 is a perspective view illustrating a state in which the lever is rotated to a second position from the state illustrated in FIG. 11.
Figure 13:
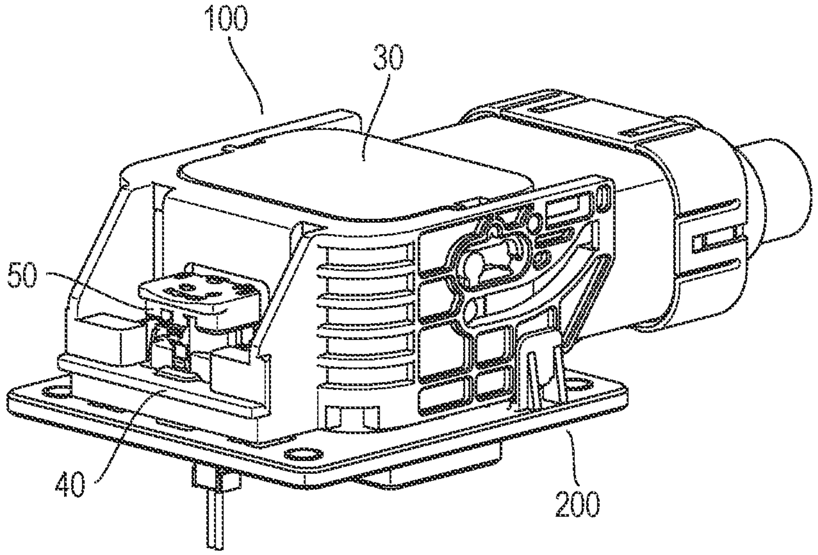
FIG. 13 is a perspective view illustrating a state in which the lever is slid to a third position from the state illustrated in FIG. 12.
Figure 14:
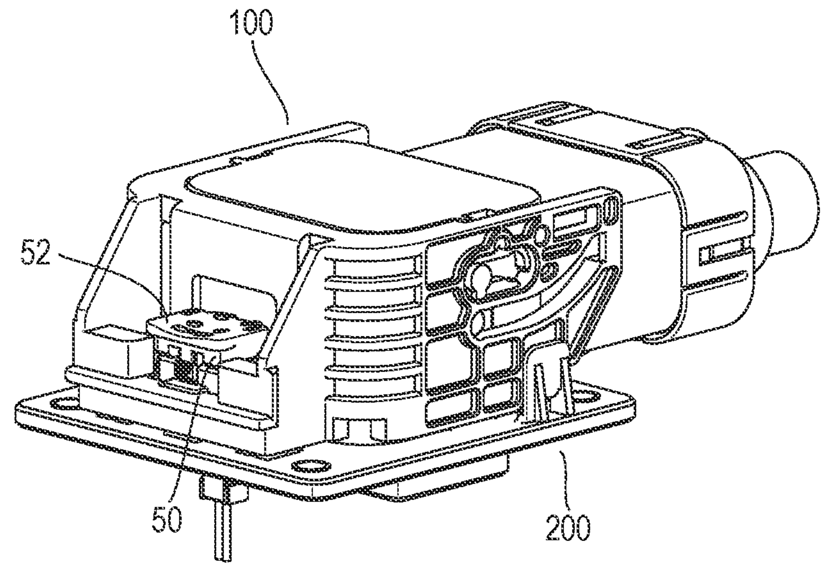
FIG. 14 is a perspective view illustrating a state in which the interlock housing is slid to a closing position from the state illustrated in FIG. 13.
Figure 15A:
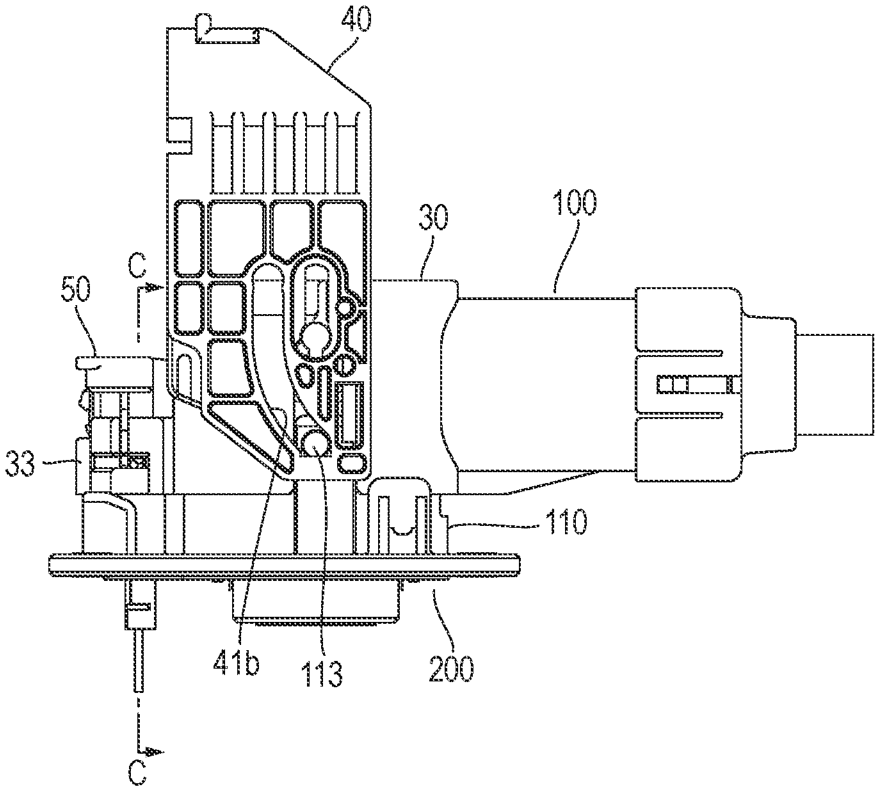
FIG. 15A is a right side view of the state illustrated in FIG. 11.
Figure 15B:
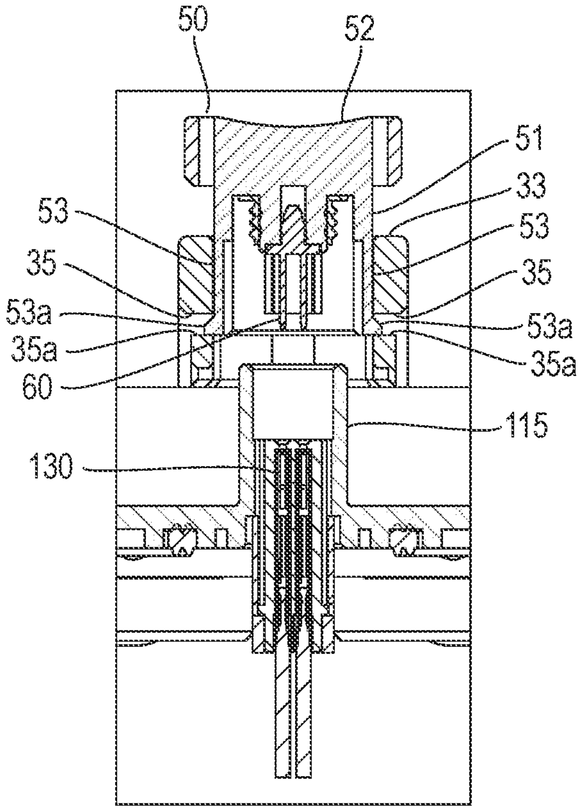
FIG. 15B is a partially enlarged sectional view taken along the C-C line of FIG. 15A.

State 1: FIGS. 11, 15A, and 15B

The state 1 is a state in which the fitting portion 31 of the housing 30 in the connector 100 whose lever 40 is in the first position is fitted to the fitted portion 112 of the mating housing 110 in the mating connector 200 and the connector 100 is in a fitting preparation position with respect to the mating connector 200. The driven bosses 113, provided in a pair, of the mating connector 200 are inserted in respective cam grooves 41*b* of the lever 40 in the connector 100. In the state 1, the main terminals 70 and the mating main terminals 120 are not connected with each other yet.

In the interlock housing 50 that is attached to the attaching portion 33 of the housing 30 in the connector 100, the protrusion portions 53*a* of the pair of spring pieces 53 are positioned in natural positions in a manner to be in the respective slits 35 of the attaching portion 33 as illustrated in FIG. 15B. Accordingly, the interlock housing 50 cannot be pushed down even though the operation portion 52 thereof is pushed because the protrusion portions 53*a* are abutted on abutting surfaces 35*a*, which are lower inner surfaces of the slits 35. In this way, the interlock housing 50 is in an opening position, blocked from sliding to a closing position to be described later in which the interlock terminals 60 of the connector 100 and the mating interlock terminals 130 of the mating connector 200 are mutually connected.

State 2: FIGS. 12, 16A, 16B, and 16C

Figure 16A:
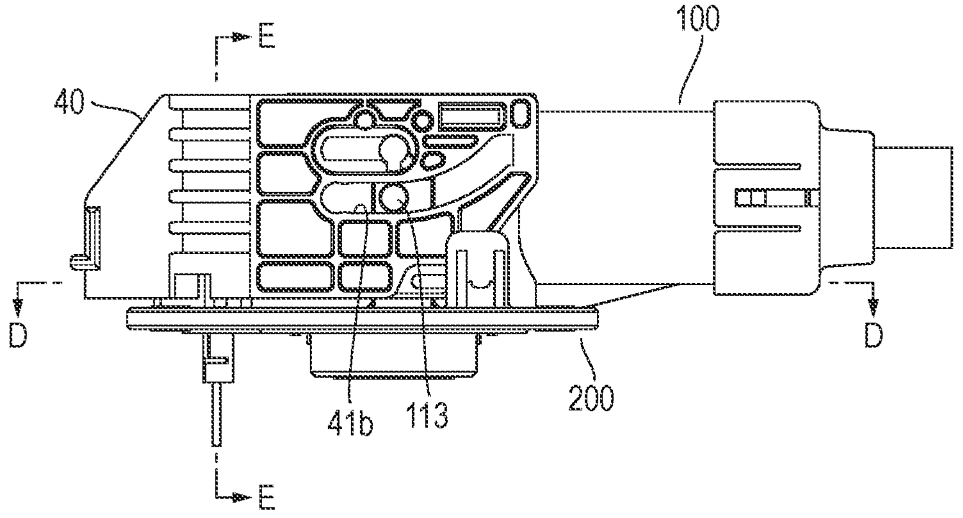
FIG. 16A is a right side view of the state illustrated in FIG. 12.
Figure 16B:
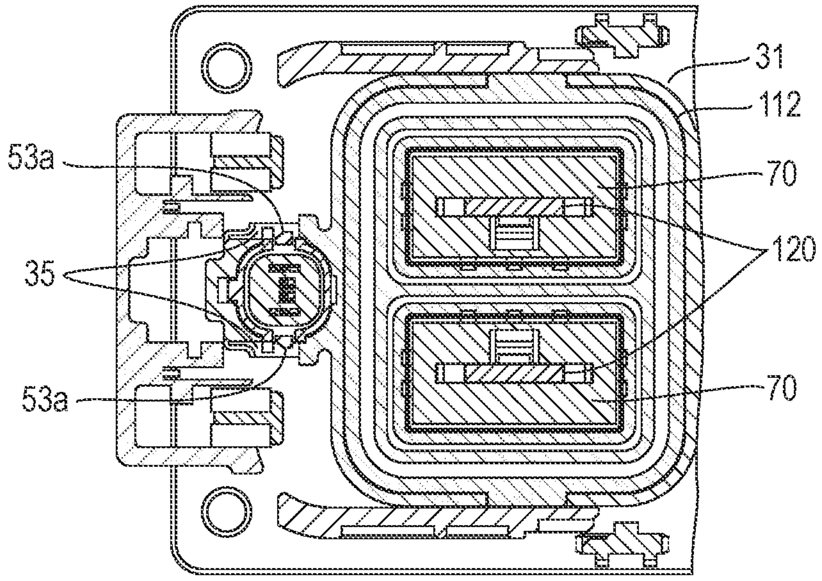
FIG. 16B is a partially enlarged sectional view taken along the D-D line of FIG. 16A.

The state 2 is a state in which the lever 40 is rotated from the first position to the second position. The connector 100 is drawn to a fitting position, which is closer to the mating connector 200 than the fitting preparation position of the state 1, by a cam mechanism so that the state 2 is achieved. The cam mechanism is composed of the cam grooves 41*b* of the lever 40 and the driven bosses 113, which enter the cam grooves 41*b*, of the mating connector 200. The main terminals 70 of the connector 100 and the mating main terminals 120 of the mating connector 200 are connected with each other in the state 2, as illustrated in FIG. 16B.

Figure 16C:
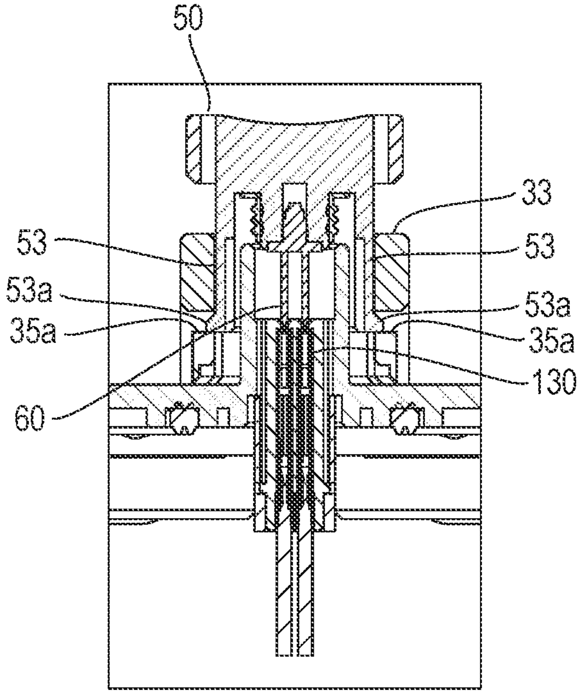
FIG. 16C is a partially enlarged sectional view taken along the E-E line of FIG. 16A.

The interlock housing 50 is in the opening position the same as in the state 1 in which the protrusion portions 53*a* of the spring pieces 53 are in natural positions. The sliding of the interlock housing 50 to the closing position is blocked and even though the connector 100 is brought closer to the mating connector 200, the interlock terminals 60 and the mating interlock terminals 130 are not connected with each other yet and are still disconnected from each other, as illustrated in FIG. 16C.

Incidentally, when the connector 100 whose lever 40 is in the second position is in the fitting position of the state 2 with respect to the mating connector 200, a rotation of the lever 40 to the first position causes the connector 100 to be pushed back to the fitting preparation position of the state 1 by the cam mechanism so that the connection between the main terminals 70 and the mating main terminals 120 is released.

State 3: FIGS. 13, 17A, 17B, and 17C

Figure 17A:
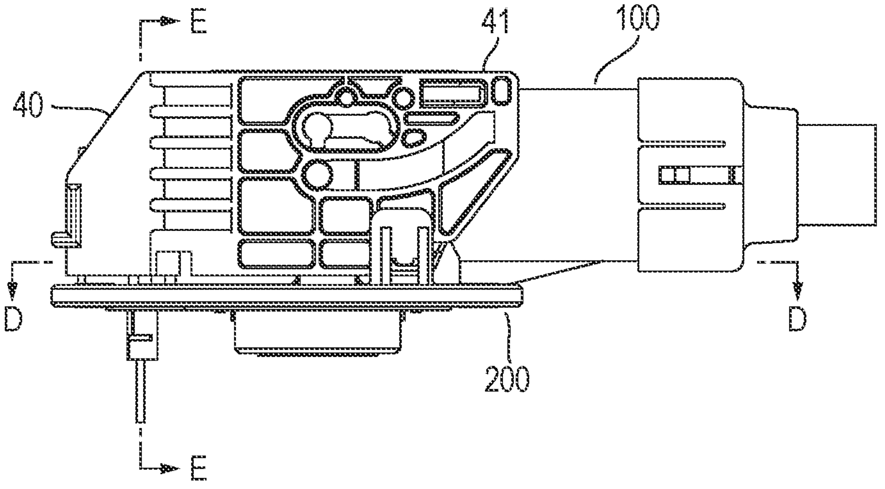
FIG. 17A is a right side view of the state illustrated in FIG. 13.
Figure 17B:
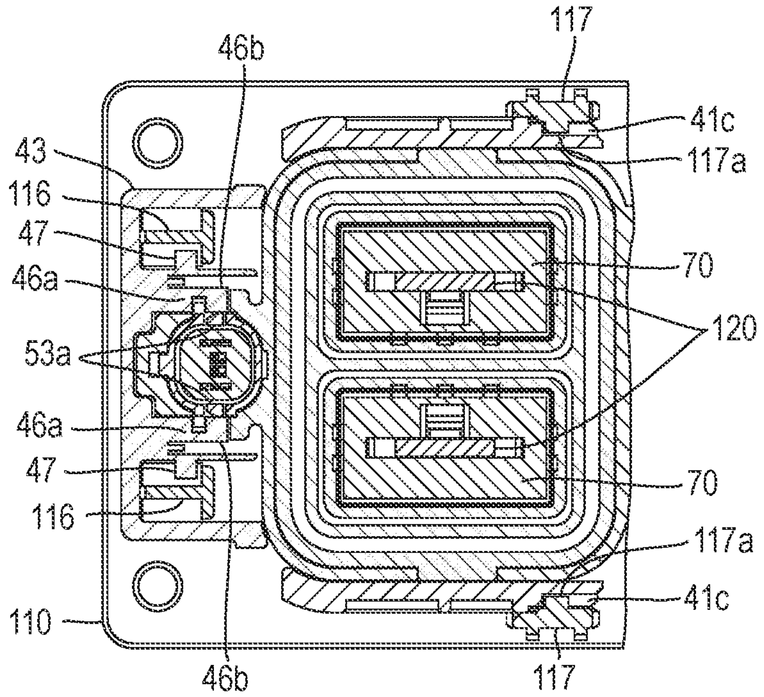
FIG. 17B is a partially enlarged sectional view taken along the D-D line of FIG. 17A.
Figure 17C:
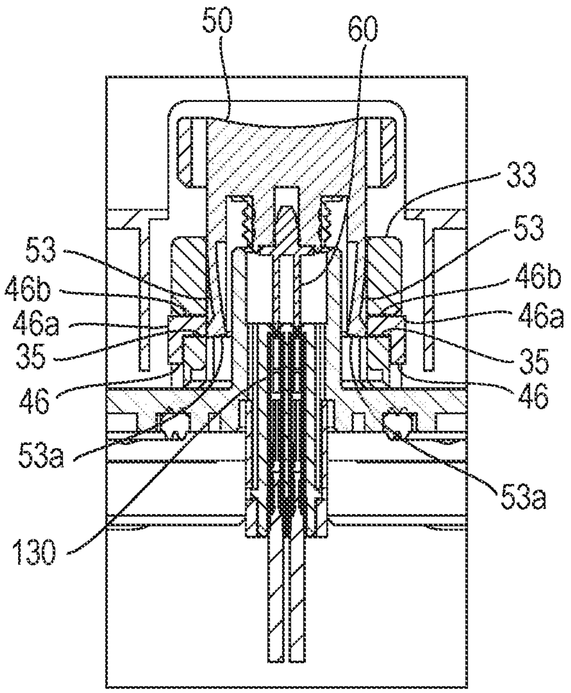
FIG. 17C is a partially enlarged sectional view taken along the E-E line of FIG. 17A.

The state 3 is a state in which the lever 40 is slid from the second position to the third position and the slide insertion portions 46*a* of the pair of protruding portions 46 of the lever 40 respectively enter the slits 35 of the housing 30. Accordingly, the protrusion portions 53*a* of the pair of spring pieces 53 of the interlock housing 50 are pressed by the pressing portions 46*b* on the ends of the slide insertion portions 46*a*, being displaced from the natural positions to retracted positions, as illustrated in FIG. 17B. The displacement of the protrusion portions 53*a* to the retracted positions enables the interlock housing 50, which is attached to the attaching portion 33 of the housing 30 in a manner to be slidable between the opening position and the closing position for the interlock housing 50 to take, to slide to the closing position.

Note that as the lever 40 becomes slidable only if the slide insertion portions 46*a* enter the slits 35 of the housing 30, the lever 40 cannot be slid to the third position when, for example, the lever 40 is not completely rotated into the second position of the state 2 and the slide insertion portions 46*a* thereby cannot enter the slits 35.

And since the slide insertion portions 46*a* of the lever 40 is configured to enter the slits 35 of the housing 30, the lever 40 in the third position cannot be rotated in the state 3.

In addition to this, in the state 3 in which the lever 40 is on the third position, as illustrated in FIG. 17B in this example, the protrusions 117*a* of the holding portions 117 equipped by the mating connector 200 enter the concave-shaped held portions 41*c* formed in the pair of arm portions 41, and further, the pair of shaft-shaped held portions 47 equipped by the operation portion 43 of the lever 40 come under the respective eaves-like portions 116*a* of the protruding portions 116 equipped by the mating connector 200. In this way, the held portions 41*c* and 47 are held respectively by the holding portions 117 and the protruding portions 116 so that the lever 40 is firmly fixed to the mating housing 110 of the mating connector 200.

State 4: FIGS. 14, 18A, 18B, 18C, and 18D

The state 4 is a state in which the interlock housing 50, which is positioned on the opening position in the state 3, is pushed along with pushing of the operation portion 52 thereof and slid to be positioned in the closing position. In the state 4, the interlock terminals 60 and the mating interlock terminals 130 are mutually connected as illustrated in FIG. 18D. Consequently, fitting is detected.

Figure 18A:
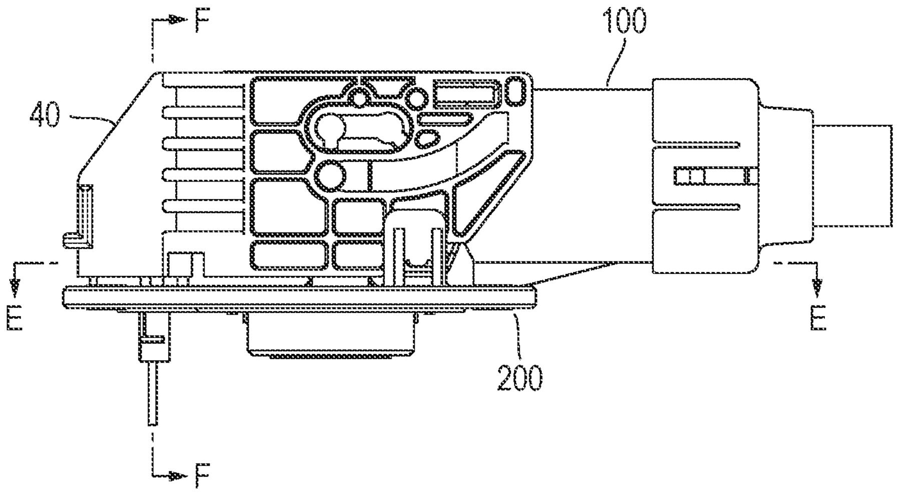
FIG. 18A is a right side view of the state illustrated in FIG. 14.
Figure 18B:
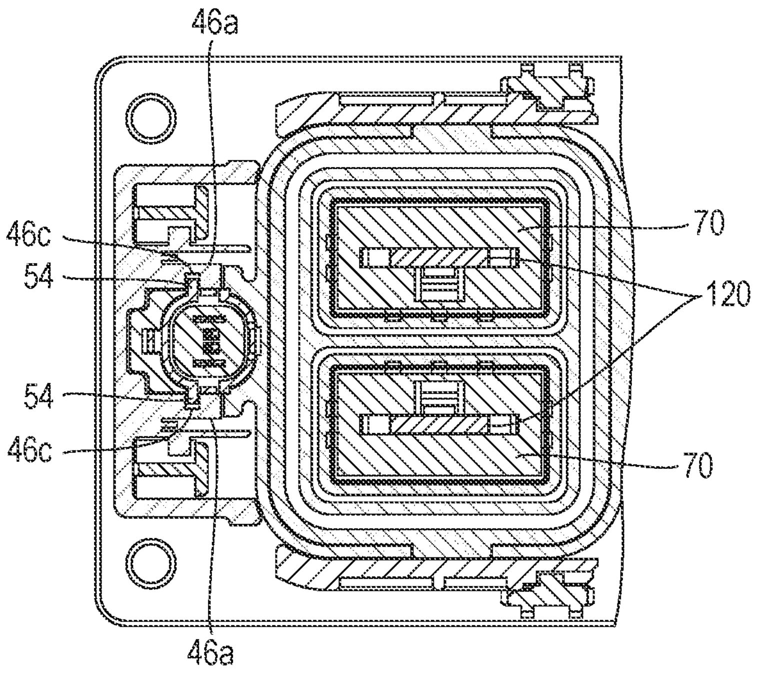
FIG. 18B is a partially enlarged sectional view taken along the E-E line of FIG. 18A.

Note that in the state in which the interlock housing 50 is pushed down to the closing position, the pair of protruding pieces 54 equipped by the interlock housing 50 enter the interference portions 46*c* which are formed as cut-out portions of the slide insertion portions 46*a* of the lever 40, as illustrated in FIG. 18B. In this way, the lever 40 is fixed in the third position and cannot be slid, that is, the protruding pieces 54 interfere with the interference portions 46*c* so that the lever 40's sliding to the second position is blocked.

The interlock housing 50 positioned in the closing position is locked in the closing position by engagement between the protrusion 55*b* of the locking piece 55 and an engaging portion 37 formed on the attaching portion 33 of the housing

Figure 18C:
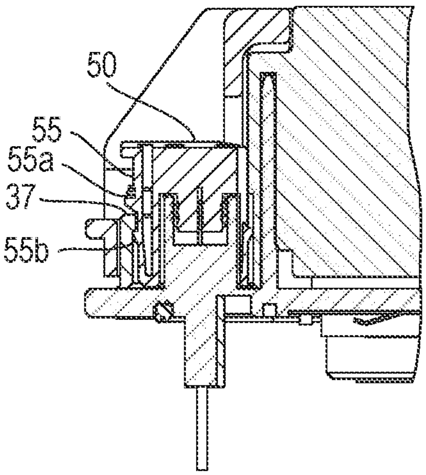
FIG. 18C is a partially enlarged view of a central longitudinal section of FIG. 18A.
Figure 18D:
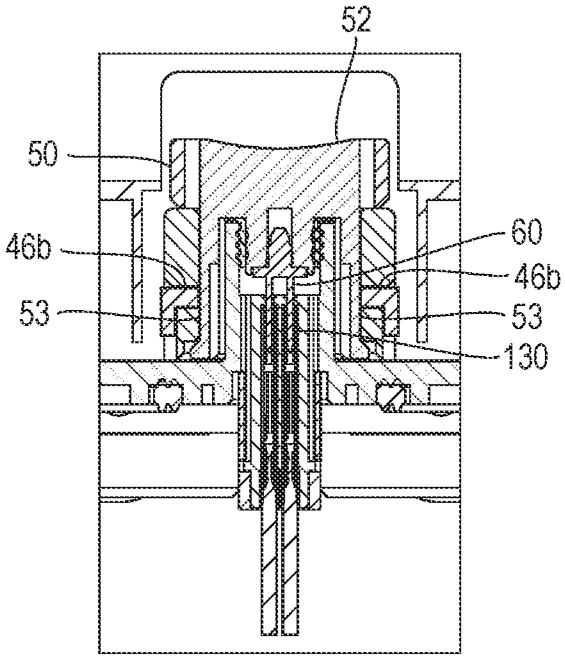
FIG. 18D is a partially enlarged sectional view taken along the F-F line of FIG. 18A.

30 as illustrated in FIG. 18C. Unlocking is performed by pushing the operation protrusion portion 55*a* of the locking piece 55, enabling the interlock housing 50 to slide-return to the opening position and then enabling the lever 40 to slide-return to the second position.

The states 1 to 4 in a series of the processes for fitting the connector 100 to the mating connector 200, which is performed based on an intention of an operator, have been described above. In this example, the lever 40 of the connector 100 includes the pair of first spring pieces 48 and the pair of second spring pieces 49. The first spring pieces 48 and the second spring pieces 49 act, for example, to prevent the lever 40 from easily sliding against the operator's intention when the operator halts the operation in the state 2, or, as the case may be, act to prevent the HVILs from being easily connected against the operator's intention when the operator halts the operation in the state 3. The description will be provided below on this point.

Figure 19A:
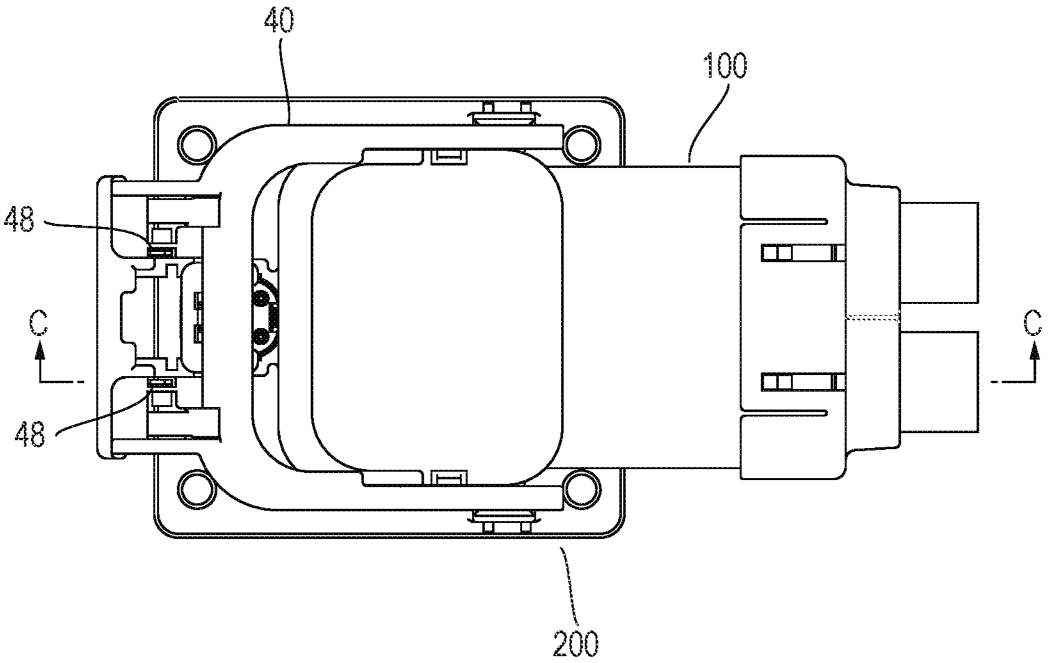
FIG. 19A is a plan view of the state illustrated in FIG. 12.
Figure 19B:
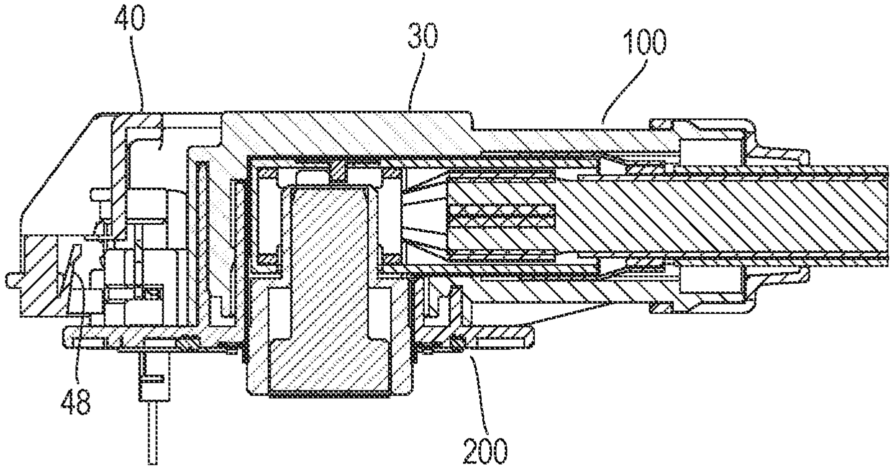
FIG. 19B is a sectional view taken along the C-C line of FIG. 19A.
Figure 20A:
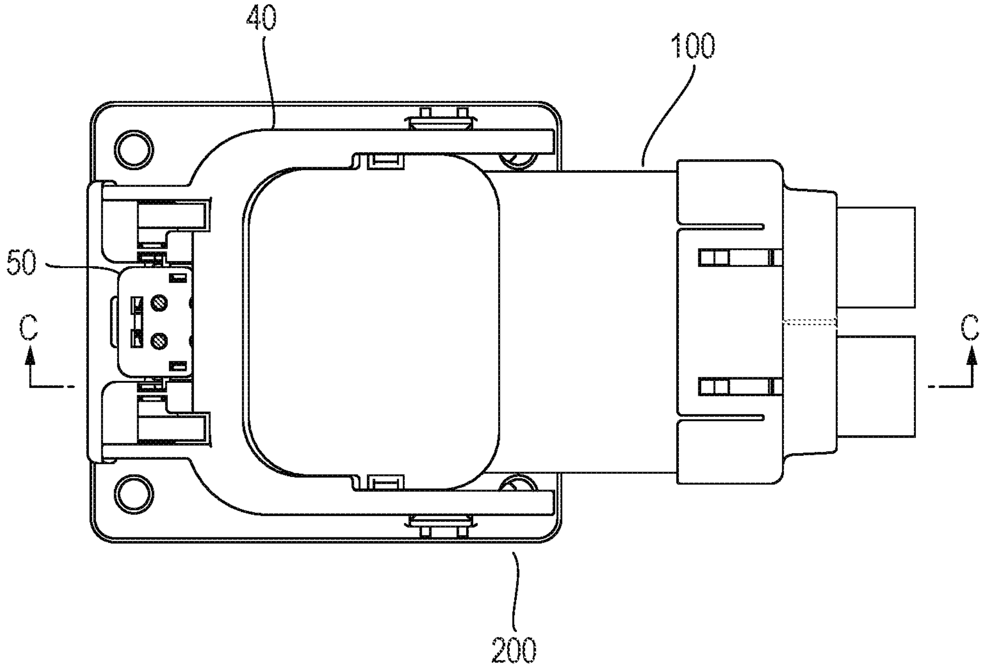
FIG. 20A is a plan view of the state illustrated in FIG. 13.
Figure 20B:
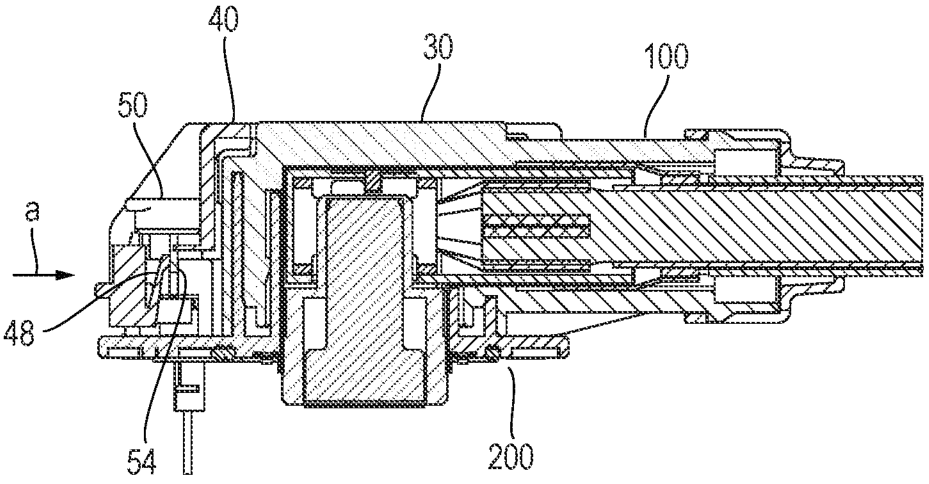
FIG. 20B is a sectional view taken along the C-C line of FIG. 20A.

FIGS. 19A and 19B, FIGS. 20A and 20B, and FIGS. 21A and 21B illustrate respective states of the first spring piece 48 in the states 2 to 4. In the state 2 which is illustrated in FIGS. 19A and 19B and in which the lever 40 is positioned in the second position, the first spring piece 48 is in a natural state (free state) without coming into contact with other components. In the state 3 in which the lever 40 had been operated to be slid to the third position, the end of the first spring piece 48 is abutted on the protruding piece 54 of the interlock housing 50 as illustrated in FIG. 20B. As a result, the first spring piece 48 generates a first elastic restoring force for sliding (pushing back) the lever 40 toward the second position. However, the state 3 is maintained when an operator applies a force that presses the lever 40 against the first elastic restoring force, that is, applies an external force, illustrated with an arrow a, for sliding the lever 40 to the third position.

On the other hand, if an operator halts the operation and releases his/her hand from the lever 40 in the state 3, then the external force illustrated with the arrow a is not applied any more and, consequently, the lever 40 is pushed back by the first elastic restoring force of the first spring piece 48 moving away from the third position. This releases the pressing by the pressing portions 46*b* against the protrusion portions 53*a* of the pair of spring pieces 53 of the interlock housing 50 which has been displaced to the retracted position by the press of the pressing portions 46*b* of the lever 40 in the state 3 as described above, letting the protrusion portions 53*a* return to the natural position. This blocks the interlock housing 50 from sliding to the closing position, that is, it becomes impossible to perform the operation for connecting (closing) the HVILs. Thus, when an operator halts the operation and releases his/her hand from the lever 40 in the state 3, the HVILs are not connected even in a case where an external force for sliding the interlock housing 50 to the closing position is applied to the interlock housing 50 against the operator's intention.

Figure 21A:
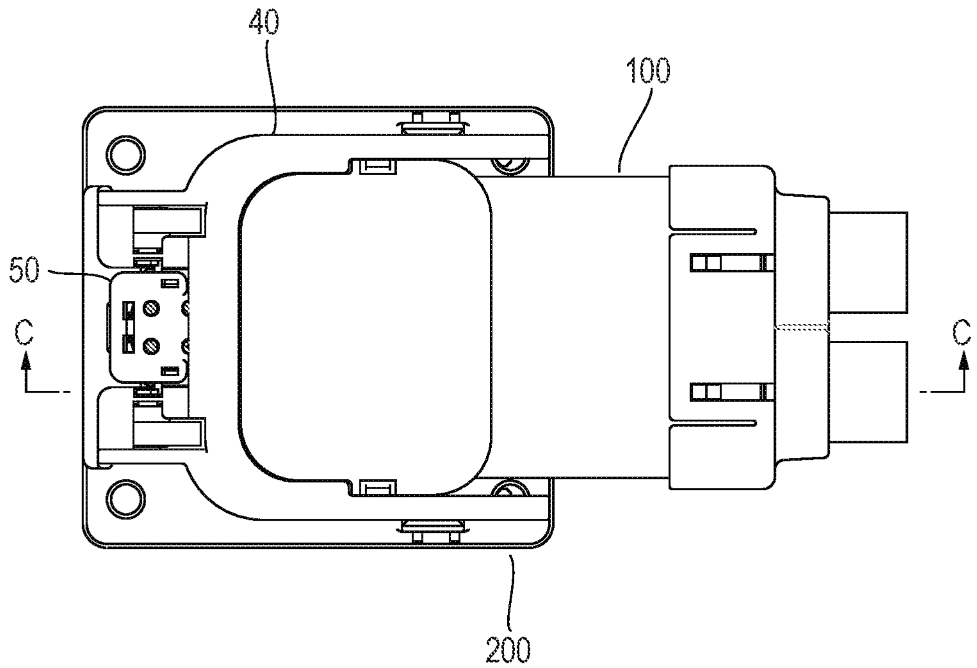
FIG. 21A is a plan view of the state illustrated in FIG. 14.
Figure 21B:
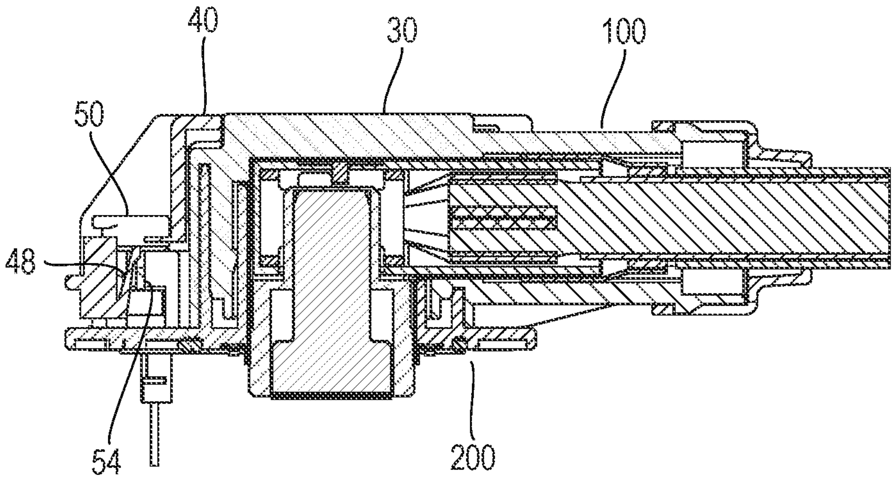
FIG. 21B is a sectional view taken along the C-C line of FIG. 21A.

In the state 4 in which the interlock housing 50 had been slid to the closing position, the protruding piece 54 of the interlock housing 50 was displaced downward and released from the abutment of the first spring piece 48 as illustrated in FIG. 21B. As the first spring piece 48 is back in the natural state in this way, settling of the first spring piece 48 can be prevented even when fitting of the connector device is kept over a long period of time.

States of the second spring piece 49 will now be described with reference to FIGS. 22A and 22B, FIGS. 23A and 23B, and FIGS. 24A and 24B.

Figure 22A:
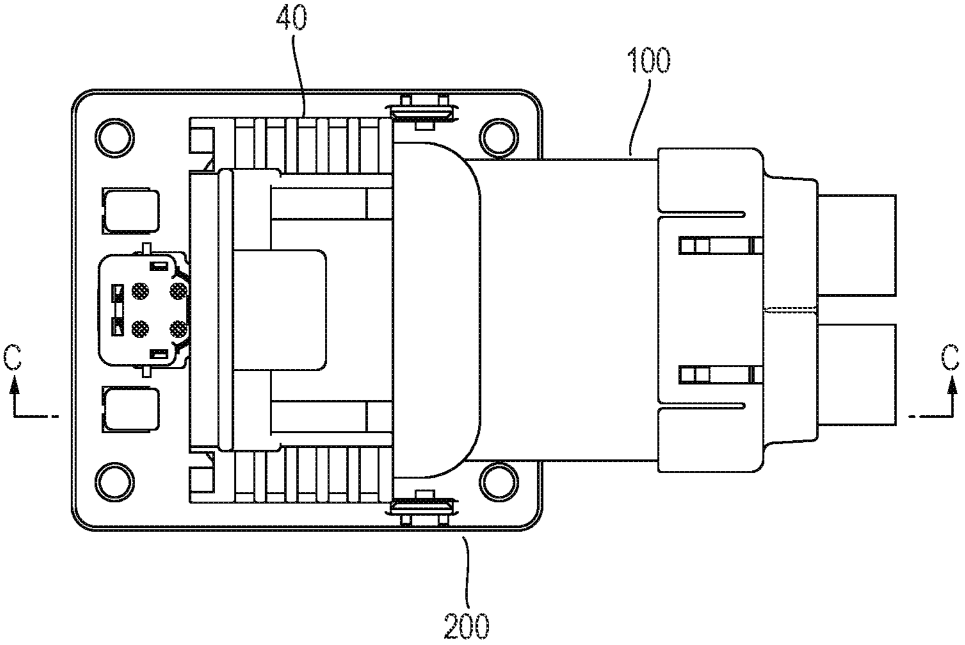
FIG. 22A is a plan view of the state illustrated in FIG. 11.
Figure 22B:
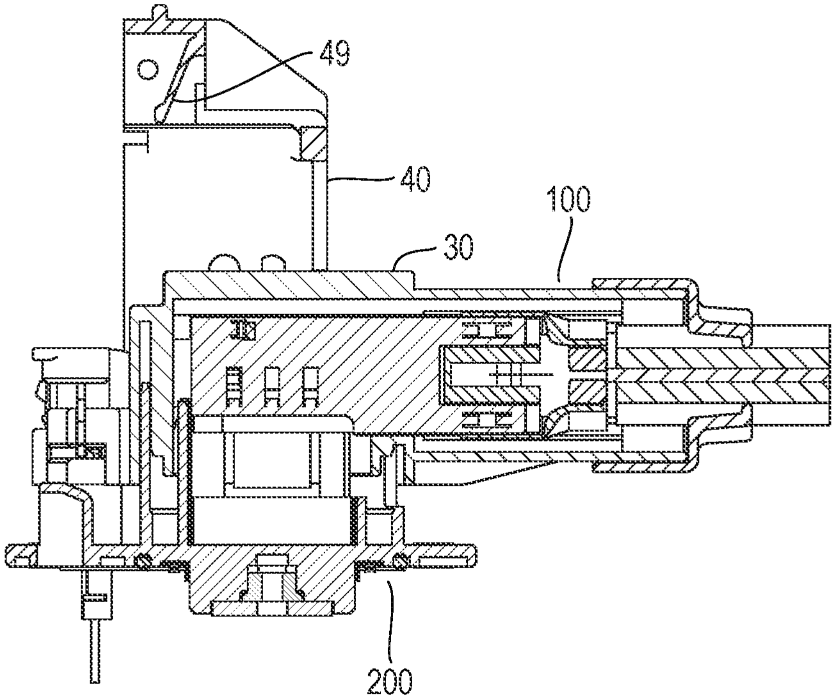
FIG. 22B is a sectional view taken along the C-C line of FIG. 22A.

In the state 1 illustrated in FIGS. 22A and 22B in which the lever 40 is positioned in the first position, the second spring piece 49 is in a natural state without coming into contact with other components. In the state 2 in which the lever 40 had been rotated to the second position, in contrast, the end of the second spring piece 49 is abutted on the upper surface of the eaves-like portion 116*a* of the upper part of the protruding portion 116 which is provided to the mating connector 200. As a result, the second spring piece 49 generates a second elastic restoring force for rotating (pushing back) the lever 40 toward the first position. However, the state 2 is maintained when an operator applies a force that presses the lever 40 against the second elastic restoring force, that is, applies an external force for rotating the lever 40 to the second position.

Figure 23A:
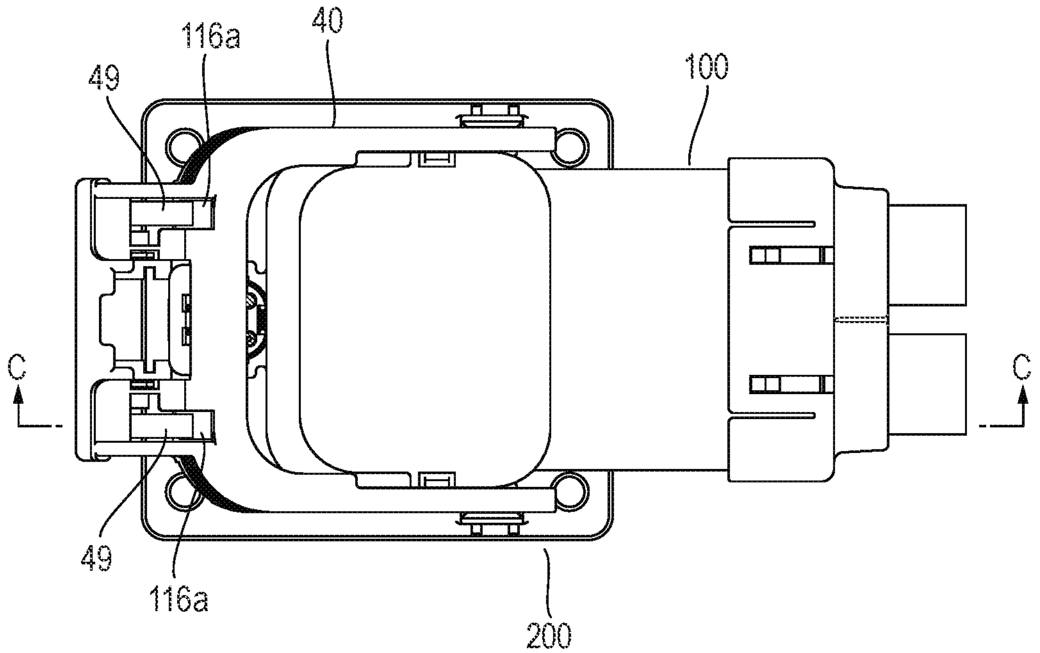
FIG. 23A is a plan view illustrating a state obtained when a force that rotates the lever is removed from the state which is illustrated in FIG. 12 and in which the lever is rotated.
Figure 23B:
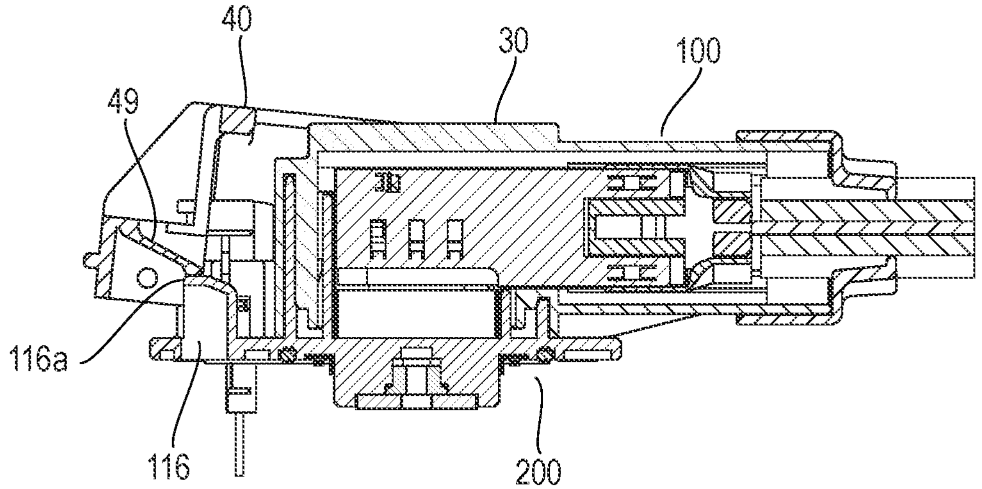
FIG. 23B is a sectional view taken along the C-C line of FIG. 23A.

On the other hand, if an operator halts the operation and releases his/her hand from the lever 40 in the state 2, then the external force that rotates the lever 40 to the second position is not applied any more and, consequently, the lever 40 is pushed back by the second elastic restoring force of the second spring piece 49 and moves away from the second position to be positioned in a position closer to the first position than the second position is to the first position. FIG. 23B illustrates this state and the lever 40 cannot be slid to the third position in this state. Thus, when an operator halts the operation and releases his/her hand from the lever 40 in the state 2, the lever 40 is not slid to the third position even in a case where an external force for sliding the lever 40 to the third position is applied to the lever 40 against the operator's intention.

Figure 24A:
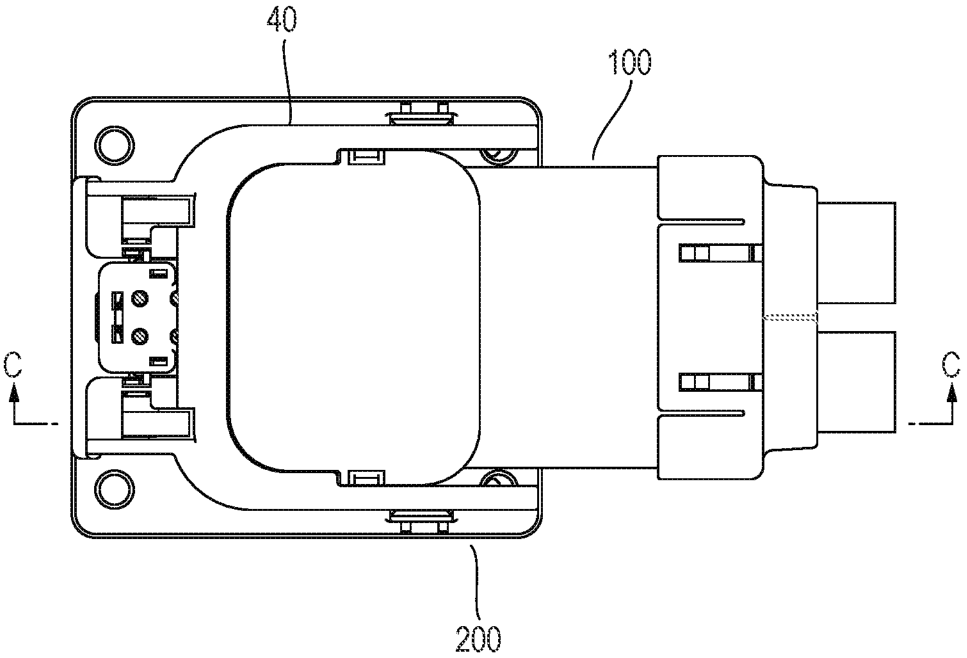
FIG. 24A is a plan view of the state illustrated in FIG. 13.
Figure 24B:
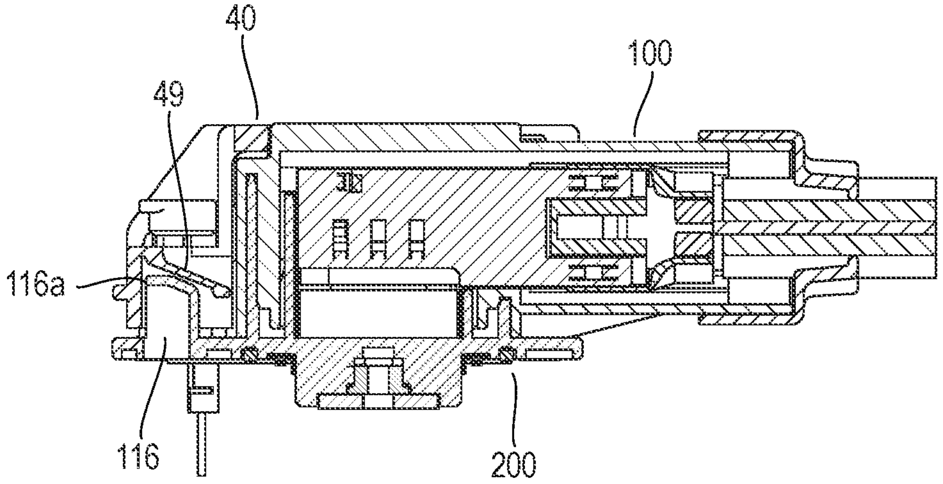
FIG. 24B is a sectional view taken along the C-C line of FIG. 24A.

FIGS. 24A and 24B illustrate the state 3 in which the lever 40 had been slid to the third portion. In the state 3, the eaves-like portion 116*a* of the protruding portion 116 is released from the abutment of the second spring piece 49 as illustrated in FIG. 24B. Accordingly, the second spring piece 49 returns to be in the natural state, and therefore, settling of the second spring piece 49 can be prevented even when fitting of the connector device is kept over a long period of time.

The configuration and the fitting operation of the connector device according to the embodiment of the present invention that comprises the connector 100 and the mating connector 200 have been described above. A circuit device is provided outside the connector device, which supplies large current between the main terminals 70 and the mating main terminals 120 when the interlock terminals 60 and the mating interlock terminals 130 for HVILs are connected to each other to close the HVIL circuit on condition that the main terminals 70 and the mating main terminals 120 for large current are connected with each other.

According to the connector device described above, the following advantageous effects can be obtained.

(1) In this example, the connection and disconnection of the HVILs are performed by pushing down and pulling up the interlock housing 50 that is provided separately from the lever 40. That is, the connection of the HVILs is performed in a manner such that after the main terminals 70 and the mating main terminals 120 are mutually connected through the rotation operation of the lever 40, the sliding operation of the lever 40 is performed and further, the interlock housing 50 is pushed down. On the other hand, the disconnection between the main terminals 70 and the mating main terminals 120 is performed in a manner such that after the HVILs are mutually disconnected by pulling up the interlock housing 50, the sliding operation of the lever 40 is performed and further, the rotation operation of the lever 40 is performed.

Thus, compared to a conventional connector device in which connection and disconnection of terminals for large current and connection and disconnection of HVILs are performed only by a lever operation comprising rotation and sliding of the lever, this example requires an additional step of pushing down or pulling up the interlock housing 50 between the connection or disconnection of main terminals for large current and the connection or disconnection of HVILs, providing a larger time interval between these two.

Accordingly, even if an operator gets used to a fitting operation and a detachment operation of the connector device and starts performing the operations fast, the connection or disconnection of main terminals for large current and the connection or disconnection of HVILs are performed with a sufficient time interval therebetween, being able to enhance safety in the fitting and detachment work of the connector device compared to the related art.

(2) When an operator halts an operation and releases his/her hand from the lever 40 in the state 2 in which the lever 40 had been rotated to the second position, the lever 40 moves away from the second position because of the action of the second spring pieces 49 and, accordingly, the lever 40 cannot be slid to the third position. Therefore, in this case, even though an external force for sliding the lever 40 is applied against the operator's intention, the lever 40 is not slid to the third position and accordingly, the HVILs are not connected.

(3) When an operator halts an operation and releases his/her hand from the lever 40 in the state 3 in which the lever 40 had been slid to the third position, the lever 40 moves away from the third position because of the action of the first spring pieces 48 and, accordingly, the interlock housing 50 cannot be slid to the closing position. Therefore, in this case, even though an external force for sliding the interlock housing 50 is applied against the operator's intention , the interlock housing 50 is not slid to the closing position and accordingly, the HVILs are not connected.

(4) The lever 40 can be slid only when the sliding operation is performed while applying at the same time a force for rotating the lever 40, and the HVILs can be connected only when the sliding operation of the interlock housing 50 is performed while applying at the same time a force for sliding the lever 40. That is, proper fitting cannot be obtained unless an appropriate operation is performed.

(5) When the lever 40 is slid to be positioned in the third position, the held portions 41*c* and 47 provided to the lever 40 are firmly held by the protruding portions 116 and the holding portions 117 of the mating connector 200, being able to prevent the lever 40 from coming off or being rubbed and worn due to vibration, for example.

(6) When the interlock housing 50 is pushed down to be positioned in the closing position, the protruding pieces 54 of the interlock housing 50 enter the interference portions 46*c* of the lever 40 and interfere the interference portions 46*c* thereby, blocking the sliding of the lever 40 to the second position. That is, fitting detection by the HVILs and locking of the lever 40, in other words, connector position assurance (CPA) can be performed through one action which is pushing down the interlock housing 50. Accordingly, a component for the CPA function does not have to be separately provided, being able to reduce the number of components.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

DESCRIPTION OF REFERENCE NUMERALS

11: connector housing
11*a:* terminal hood portion
11*b:* guide pin
12: lever
12*a:* arm plate portion
12*b:* arm plate portion
12*c:* operation portion
12*d:* connector portion
13: terminal
14: guide groove
15: cam groove
16: fitting detection male terminal
21: connector housing
21*a:* cam pin
21*b:* mounting space
21*c:* terminal hood accommodating portion
21*d:* connector portion
22: terminal
23: fitting detection female terminal
30: housing
31: fitting portion
32: cable accommodating portion
33: attaching portion
34: guide shaft
35: slit
35*a:* abutting surface
36: slit
37: engaging portion
38: concave portion
39: frame portion
40: lever
41: arm portion
41*a:* guide groove
41*b:* cam groove
41*c:* held portion
42: coupling portion
42*a:* opening
43: operation portion
43*a:* opening
44: reinforcing wall
45: wall portion
46: protruding portion
46*a:* slide insertion portion
46*b:* pressing portion
46*c:* interference portion
47: held portion
48: first spring piece
49: second spring piece
50: interlock housing
51: cylindrical portion
51*a:* circumferential wall
52: operation portion
53: spring piece
53*a:* protrusion portion

54: protruding piece
55: locking piece
55*a:* operation protrusion portion
55*b:* protrusion
56: retaining piece
56*a:* protrusion
57: plate portion
58: stepped portion
60: interlock terminal
70: main terminal
80: cable cover
100: connector
110: mating housing
111: plate portion
112: fitted portion
112*a:* circumferential wall
113: driven boss
114: cutout
115: attaching portion
116: protruding portion
116*a:* eaves-like portion
116*b:* upright portion
117: holding portion
117*a:* protrusion
120: mating main terminal
130: mating interlock terminal
200: mating connector
300: cable

What is claimed is:

1. A connector device comprising:

a connector including a housing, a lever, a main terminal, an interlock housing, and an interlock terminal; and a mating connector including a mating housing, a mating main terminal, and a mating interlock terminal, wherein one of the lever and the housing has a guide groove, and the other of the lever and the housing has a guide shaft, the lever is attached to the housing with the guide shaft located in the guide groove, thereby being rotatable between a first position and a second position and slidable between the second position and a third position, where the first position, the second position, and the third position are positions for the lever to take relative to the housing, the lever has either a cam groove or a driven boss, and the mating housing has the other, the cam groove and the driven boss constituting a cam mechanism, the connector with the lever in the first position is in a fitting preparation position relative to the mating connector, and rotating the lever from the first position to the second position causes the connector to move due to the cam mechanism from the fitting preparation position to a fitting position closer to the mating connector than the fitting preparation position is thereto, and thereby the main terminal and the mating main terminal are mutually connected, the interlock terminal is attached to the interlock housing, the interlock housing has a spring piece and a protruding piece, the spring piece having on an end thereof a protrusion part protruding outward, wherein the protrusion part moves from a natural position to a retracted position by being pressed, the housing has a stopping surface, the interlock housing is attached to the housing in a manner that allows the interlock housing to slide between an opening position and a closing position, wherein the interlock housing in the opening position is blocked from sliding to the closing position by the protrusion part being in contact with the stopping surface while the protrusion part is in the natural position, and is slidable to the closing position while the protrusion part is in the retracted position, the interlock terminal and the mating interlock terminal are mutually disconnected while the connector is in the fitting position relative to the mating connector and the interlock housing is in the opening position, the interlock terminal and the mating interlock terminal are mutually connected while the connector is in the fitting position relative to the mating connector and the interlock housing is in the closing position, the lever has a pressing part, the protrusion part is in the natural position while the connector is in the fitting position relative to the mating connector and the lever is in the second position, the protrusion part is in the retracted position by the pressing part continuing to press the protrusion part while the connector is in the fitting position relative to the mating connector and the lever is in the third position, the lever has a first spring piece, the first spring piece presses the protruding piece of the interlock housing and thereby generates a first elastic restoring force for pushing the lever back toward the second position, while the connector is in the fitting position relative to the mating connector, the lever is in the third position, and the interlock housing is in the opening position, and without external force for sliding the lever to the third position against the first elastic restoring force of the first spring piece, the lever moves away from the third position due to the first elastic restoring force, causing the pressing part to stop pressing the protrusion part and thereby the protrusion part returns to the natural position.

2. The connector device according to claim 1, wherein the lever has an interference part, and while the interlock housing is in the closing position, the protruding piece is released from a press by the first spring piece of the lever and interferes with the interference part, causing the lever to be blocked from sliding to the second position.

3. The connector device according to claim 1, wherein the lever has a second spring piece and the mating housing has a protruding part, while the connector is in the fitting position relative to the mating connector and the lever is in the second position, the second spring piece is in contact with the protruding part of the mating housing and thereby generates a second elastic restoring force for pushing the lever back toward the first position, and without external force for rotating the lever to the second position against the second elastic restoring force of the second spring piece, the lever is pushed back from the second position toward the first position due to the second elastic restoring force.

4. The connector device according to claim 2, wherein the lever has a second spring piece and the mating housing has a protruding part, while the connector is in the fitting position relative to the mating connector and the lever is in the second position, the second spring piece is in contact with the protruding part of the mating housing and thereby generates a second elastic restoring force for pushing the lever back toward the first position, and without external force for rotating the lever to the second position against the second elastic restoring force of the second spring piece, the lever is pushed back from the second position toward the first position due to the second elastic restoring force.

5. The connector device according to claim 3, wherein while the connector is in the fitting position relative to the mating connector and the lever is in the third position, the second spring piece is released from a press by the protruding part of the mating housing.

6. The connector device according to claim 4, wherein while the connector is in the fitting position relative to the mating connector and the lever is in the third position, the second spring piece is released from a press by the protruding part of the mating housing.

* * * * *